US012240991B2

(12) United States Patent
Landa et al.

(10) Patent No.: US 12,240,991 B2
(45) Date of Patent: Mar. 4, 2025

(54) COMPOSITIONS AND PROTECTIVE COATINGS MADE THEREFROM

(71) Applicant: LANDA LABS (2012) LTD., Rehovot (IL)

(72) Inventors: Benzion Landa, Nes Ziona (IL); Meir Soria, Jerusalem (IL); Omer Ashkenazi, Kfar Gibton (IL); Sagi Abramovich, Ra'anana (IL)

(73) Assignee: LANDA CORPORATION LTD., Rehovot (IL)

( * ) Notice: Subject to any disclaimer, the term of this patent is extended or adjusted under 35 U.S.C. 154(b) by 739 days.

(21) Appl. No.: 17/432,144

(22) PCT Filed: Mar. 19, 2020

(86) PCT No.: PCT/IB2020/052502
§ 371 (c)(1),
(2) Date: Aug. 19, 2021

(87) PCT Pub. No.: WO2020/188509
PCT Pub. Date: Sep. 24, 2020

(65) Prior Publication Data
US 2022/0154040 A1    May 19, 2022

(30) Foreign Application Priority Data
Mar. 19, 2019  (GB) ..................... 1903769

(51) Int. Cl.
| C08F 2/46 | (2006.01) |
| B41N 7/00 | (2006.01) |
| C08F 2/50 | (2006.01) |
| C08G 61/04 | (2006.01) |
| C08G 77/00 | (2006.01) |
| C08G 77/08 | (2006.01) |
| C08G 77/16 | (2006.01) |
| C08K 5/5415 | (2006.01) |
| C09D 5/02 | (2006.01) |
| C09D 183/04 | (2006.01) |

(52) U.S. Cl.
CPC ........... C09D 183/04 (2013.01); B41N 7/005 (2013.01); C08G 77/08 (2013.01); C08G 77/16 (2013.01); C08G 77/80 (2013.01); C08K 5/5415 (2013.01); C09D 5/022 (2013.01); B41N 2207/02 (2013.01); C08G 2150/00 (2013.01)

(58) Field of Classification Search
CPC ........ C08G 77/16; C08G 77/80; C08G 77/08; C08G 2150/00; C08K 5/5415; C08L 83/00; C09D 183/04; C09D 5/022; B41N 7/0005
USPC .......................................... 522/99, 1; 520/1
See application file for complete search history.

(56) References Cited

U.S. PATENT DOCUMENTS

| 3,650,211 A | 3/1972 | Nentwich |
| 5,019,860 A | 5/1991 | Matsuo et al. |
| 5,029,525 A | 7/1991 | Jeschke |
| 5,408,297 A | 4/1995 | Matsuo et al. |
| 5,473,407 A | 12/1995 | Fuchioka et al. |
| 5,555,812 A | 9/1996 | Ruckmann et al. |
| 5,678,486 A | 10/1997 | Bachmeir et al. |
| 7,673,563 B2 | 3/2010 | Mutschall |
| 9,290,016 B2 | 3/2016 | Landa et al. |
| 11,370,217 B2 | 6/2022 | Lean et al. |
| 2003/0166818 A1* | 9/2003 | Griswold .............. C09J 183/04  528/34 |
| 2005/0150408 A1 | 7/2005 | Hesterman |
| 2006/0042486 A1 | 3/2006 | Forch et al. |
| 2010/0282101 A1 | 11/2010 | Masuda |
| 2015/0022602 A1 | 1/2015 | Landa et al. |
| 2015/0197666 A1 | 7/2015 | Shimizu et al. |
| 2017/0160677 A1 | 6/2017 | Portnoy et al. |
| 2021/0370667 A1 | 12/2021 | Lean et al. |
| 2022/0153014 A1 | 5/2022 | Landa |
| 2022/0388300 A1 | 12/2022 | Lean et al. |

FOREIGN PATENT DOCUMENTS

| CN | 1077681 A | 10/1993 |
| CN | 101352958 A | 1/2009 |
| CN | 101578179 A | 11/2009 |
| CN | 104220934 A | 12/2014 |
| CN | 204184059 U | 3/2015 |
| CN | 108472825 A | 8/2018 |
| DE | 102004031767 A1 | 1/2006 |
| DE | 102008060557 A1 | 6/2010 |
| DE | 102016209344 A1 | 5/2017 |
| EP | 0495320 A1 | 7/1992 |

(Continued)

OTHER PUBLICATIONS

CN101352958A Machine Translation (by EPO and Google)—published Jan. 28, 2009; Jianping Shen.
CN101578179A Machine Translation (by EPO and Google)—published Nov. 11, 2009; Komori Printing Mach.
CN1077681A Machine Translation (by EPO and Google)—published Oct. 27, 1993; Heidelberger Druckmasch AG [DE].
CN108472825A Machine Translation (by EPO and Google)—published Aug. 31, 2018; Koenig & Bauer AG.
CN204184059U Machine Translation (by EPO and Google)—published Mar. 4, 2015; Riso Kagaku Corp.
DE102004031767A1 Machine Translation (by EPO and Google)—published Jan. 26, 2006; Roland Man Druckmasch [DE].
DE102008060557A1 Machine Translation (by EPO and Google)—published Jun. 10, 2010; Heidelberger Druckmasch AG [DE].

(Continued)

Primary Examiner — Jessica Whiteley
(74) Attorney, Agent, or Firm — Marc Van Dyke; Momentum IP

(57) ABSTRACT

There is disclosed a condensation curable coating composition in the form of an oil-in-oil emulsion, the coating composition being able to protect surfaces coated therewith from undesired contamination by materials coming in contact therewith. The surfaces to be so protected by the coating composition, once cured, can, by way of illustration, be of parts of printing systems and the materials coming in contact with such surfaces can be ink images or residues thereof.

22 Claims, 4 Drawing Sheets

(56) References Cited

FOREIGN PATENT DOCUMENTS

| | | |
|---|---|---|
| EP | 2823362 B1 | 7/2020 |
| GB | 764560 A | 12/1956 |
| GB | 2277933 | 11/1994 |
| JP | S6072241 U | 5/1985 |
| JP | H11198342 A | 7/1999 |
| JP | H11227164 A | 8/1999 |
| JP | 2002307606 | 10/2002 |
| JP | 2012058633 A | 3/2012 |
| JP | 2013226654 A | 11/2013 |
| JP | 2015514606 A | 5/2015 |
| JP | 2015524756 A | 8/2015 |
| JP | 2016155369 A | 9/2016 |
| JP | 2019217664 A | 12/2019 |
| WO | 9942290 A1 | 8/1999 |
| WO | 2004013704 A1 | 2/2004 |
| WO | 2017208152 A1 | 12/2017 |
| WO | 2018029085 A1 | 2/2018 |

OTHER PUBLICATIONS

DE102016209344A1 Machine Translation (by EPO and Google)—published May 24, 2017; Koenig & Bauer AG [DE].

JP2012058633A Machine Translation (by EPO and Google)—published Mar. 22, 2012; Seiko Epson Corp.

JP2013226654A Machine Translation (by EPO and Google)—published Nov. 7, 2013; Komori Corp.

JP2015524756A Machine Translation (by EPO and Google)—published Aug. 27, 2015; Heidelberger Druckmaschinen AG.

JP2016155369A Machine Translation (by EPO and Google)—published Sep. 1, 2016; Xerox Corp.

JP2019217664A Machine Translation (by EPO and Google)—published Dec. 26, 2019; Canon KK.

JPH11198342A Machine Translation (by Google Patents)—published Jul. 27, 1999; Mitsubishi Heavy Ind Ltd.

JPS6072241U Machine Translation (by Google Patents)—published May 21, 1985; Toru Hashido et al.

WO2018029085A1 Machine Translation (by EPO and Google)—published Feb. 15, 2018; Koenig & Bauer AG.

JPH11227164A Machine Translation (by EPO and Google)—published Aug. 24, 1999; Ryobi Ltd.

* cited by examiner

COMPOSITIONS AND PROTECTIVE COATINGS MADE THEREFROM

CROSS-REFERENCE TO RELATED APPLICATIONS

This is the U.S. national stage of International Patent Application No. PCT/IB2020/052502, filed on Mar. 19, 2020, which claims the benefit of United Kingdom Patent Application No. GB 1903769.6, filed on Mar. 19, 2019, the contents of which are incorporated by reference herein in their entirety.

FIELD

The present disclosure relates to a coating composition capable of preventing undesired build-up of contaminants on the surface of articles, such as the deleterious accumulation of inks and residues thereof on parts of printing systems including, in particular, on an impression or perfecting cylinder.

BACKGROUND

Printing processes (whether digital or not) can be divided between direct and indirect printing. In direct printing, ink materials (e.g., liquid or solid) are directly deposited on the intended printing substrate (e.g., paper or plastics foils, in the form of individual sheets or continuous web). Home inkjet printers are one example of this category. In indirect printing, the ink materials are deposited on an intermediate transfer member (ITM) where the initial ink image formed thereby may optionally be transformed (e.g., a carrier of a liquid ink can be evaporated, a solid ink can be softened, etc.). Then the "transformed ink image" (this term additionally encompassing the non-transformed alternative simply transiting via an ITM) can be transferred, in one or more steps, to the intended printing substrate at an impression nip where the ink image contacts and attach to the substrate. The impression nip is generally formed of a pressure cylinder and an impression cylinder, and may further include passing therebetween, when the printing apparatus is operating, a flexible ITM and a substrate fed thereto, the pressure and impression cylinders urging at the nip contact between the transformed ink image on the ITM and the substrate.

While ink images in indirect printing processes are supposed, ideally, to reach the impression nip sufficiently transformed to fully transfer to the printing substrate, leaving a clean ITM (e.g., a printing blanket or an endless belt), this is not always the case. Attempts to improve transfer are generally based on prolonging the time a transformed image would display preferential affinity to the substrate than to the ITM, when the two contact one another at the impression nip. An ink image reaching the nip able to achieve such transfer is defined as being "tacky" (in the sense of being fully transferable, and not necessarily tacky to the touch). Augmenting the transferability can be viewed as increasing the "open time" of the ink image, "closure" being deemed to occur once the fully transferred image is securely and entirely attached to the substrate. However, this prolonged "tackiness" (i.e. ability of the image to transfer between contacting surfaces) may in turn create a new problem downstream of the impression nip. For instance, an ink image transferred to a printing substrate may remain sufficiently "open" (retain enough tackiness) to adversely stick to parts of the printing system along the printing path of the printed substrate. This may cause smearing of the image and if such parts are later contacted by a subsequent substrate, this may result in "propagation" of the smeared inks from one printed substrate to another. In some cases, the ability of an ink image once on the substrate to cause such unintended contamination of surfaces of the press is not entirely due to the properties of the printed substrate (e.g., the ability of the particular inks in their actual pattern in the ink image to attach to a certain printing substrate). Clearly, the operating conditions of the printing system (e.g., speed, temperature, pressure, and the like) may also unfavorably contribute to such an outcome. Understandingly, elevated speed, temperature, and/or pressure may aggravate the problem.

In particular, when the ink image side of the printed substrate runs in contact with downstream surfaces (e.g., an impression cylinder for printing on a second side of the substrate, also known as a perfecting cylinder) before the ink image is "closed", some of the transferred ink image may stick to the surface yielding undesired parasitic residues on a subsequent substrate or portion thereof contacting the same surface. As mentioned, this problem is worsened by the relatively high pressure (up to 750 Newton per square centimeter—$N/cm^2$) applied on the ink image, a perfecting cylinder being for instance typically operated at a pressure ranging from 50 to 700 $N/cm^2$, depending on the printing technology and particular apparatus. Moreover, as the transfer of a second image on a second side of the printed substrate may require an elevated temperature to facilitate transfer of the second image from the ITM to the second side, such temperature might essentially traverse the substrate and be perceived by the first image presently facing the surface of the perfecting cylinder. Thus, even if the first image were closed at ambient temperature, a greater temperature may "re-open" it sufficiently to contaminate a surface contacted therewith. Considering speed as an additional factor, it can readily be appreciated that increasing the speed of a printing apparatus (e.g., from tens of sheets per hour, taking for instance B1 format, or one meter/minute, for web substrate, to 18,000 sheets per hour or 400 m/minute) may in turn require increasing pressure and/or temperature at the nip formed by the perfecting cylinder and a pressure roller, the deleterious effects of which need not be repeated. While in the above illustration, the perfecting cylinder was described as a second impression station downstream of a first impression station where a first ink image is transferred to a first side of the substrate, this need not necessarily be the case. In some printing apparatus, the substrate can be flipped and its second side fed to the same impression cylinder (alternatively serving as "first side" impression cylinder and "second side" impression cylinder, hence as perfecting cylinder).

As the surface transporting the printing substrate (e.g., the surface of an impression or perfecting cylinder) becomes less and less even, as the residues of the ink image build-up, subsequent transfers may be performed in decreasing and/or erratic contact between the transformed image on the ITM and the substrate, further lowering print quality. In extreme cases, undesired build-up of contaminants on surfaces involved in the transport of the substrate during the printing process may even cause "paper jams", which in turn cause interruptions and reduce the operative efficiency of the printing system. Therefore, there is a need to decrease the ability of insufficiently closed ink images (e.g., not dried enough) and/or of ink images subjected to strenuous (re-opening) operating conditions to adhere to such surfaces.

SUMMARY

As surfaces of parts of a printing system can be made of various materials (e.g., metals, alloys, ceramics, plastics, etc.), it would be advantageous to develop a "universal" composition able to coat a variety of surfaces, while being able to reduce, and preferably prevent, attachment of a wide range of undesired residues to the surfaces, the residues also possibly resulting from different types of ink images and inks having served to the formation of the image. Alternatively, such a protective composition may be specific to a group of materials from which protective coats, sleeves or jackets can be prepared to cover or envelop the surface, serving as intermediate support to the composition.

Ideally, a coating composition should provide for the formation of a uniform (e.g., continuous, having even properties, etc.) coating over the entire surface of the part to be coated, the finished coating strongly adhering to the coated part being resistant to the operating conditions of the printing apparatus where the coated parts are to be used. While for simplicity, the following description will consider the case of a coating composition being directly applied to a surface to be protected from undesired accumulation of contaminant, this should not be construed as limiting. The coating composition can similarly be applied to an intermediate support separately attached to the surface to be protected, the composition being therefore "indirectly" applied to the surface. For instance, a coating composition directly applied to a jacket being releasably secured to the outer surface of an impression cylinder may be considered indirectly applied to the impression cylinder to which the replaceable jacket is secured.

The present disclosure is directed to answer the foregoing needs for coating compositions that may protect surfaces from undesired contamination. While such protective compositions are described and designed to overcome the limitations observed in the field of printing, their use is not limited to this particular industry.

While the following description will consider in more details the case of an impression element (cylinder or plate), this part of a printing system being typically subject to the highest level of pressure that may develop in such systems, the coating composition can similarly be applied to any other article or part thereof that may benefit therefrom. The skilled person may readily appreciate that a protective coating able to reduce or prevent accumulation of contaminants as a result from transfer under a relatively elevated pressure, can more easily reduce or prevent accumulation of contaminants as a result from transfer under a relatively lower pressure. Articles that may suitably be coated by the coating compositions as herein disclosed, include, but are not limited to, impression elements, such as impression plates, impression cylinders, and perfecting cylinders; substrate transport conveyers, such as transport cylinders and grippers; ITM-contacting elements, such as guiding plates, guiding rollers, guiding projections, driving rollers, tensioning rollers; and any like part of a printing system that may intentionally or not come into contact with an ink image, a transformed ink image or a transferred ink image. Moreover, while inks have been considered as a possible "contaminant" in the context of printing systems, where the present coating compositions can consequently be of use, this should not be construed as limiting. The protective coatings can similarly prevent or reduce contamination by paints, varnishes or any other coloring composition as may be used in any industry other than printing.

In a first aspect, the disclosure provides a condensation curable (or cross-linkable) coating composition as claimed in the appended claims and further detailed herein.

In a second aspect, the disclosure provides an article of manufacture having at least one surface or a portion thereof coated with condensation curable coating compositions as claimed in the appended claims and further detailed herein, the coating compositions being cured so as to provide a protective coating to the article.

In a third aspect, the disclosure provides a printing system including an article (e.g., an impression plate or a rotatable impression cylinder), at least a portion of the article outer surface being coated with condensation curable coating compositions as claimed in the appended claims and further detailed herein, the coating compositions being cured so as to provide a protective coating to the article during the operation of the printing system.

In a further aspect, the disclosure provides a kit of parts for preparing a condensation curable coating composition as claimed in the appended claims and further detailed herein.

In a further aspect, the disclosure provides a method of preparing a condensation curable coating composition as claimed in the appended claims and further detailed herein.

In a further aspect, the disclosure provides a method of coating a surface with a condensation curable coating composition as claimed in the appended claims and further detailed herein.

In a further aspect, the disclosure provides a method of curing a condensation curable coating composition as claimed in the appended claims and further detailed herein, the composition being applied to a surface.

In a further aspect, the disclosure provides a reaction product of constituents of a coating composition as claimed in the appended claims and further detailed herein.

These and additional benefits and features of the disclosure will be better understood with reference to the following detailed description taken in conjunction with the figures and non-limiting examples.

BRIEF DESCRIPTION OF THE DRAWINGS

Some embodiments of the disclosure will now be described further, by way of example, with reference to the accompanying figures, where like reference numerals or characters indicate corresponding or like components. The description, together with the figures, makes apparent to a person having ordinary skill in the art how some embodiments of the disclosure may be practiced. The figures are for the purpose of illustrative discussion and no attempt is made to show structural details of an embodiment in more detail than is necessary for a fundamental understanding of the disclosure. For the sake of clarity and convenience of presentation, some objects depicted in the figures are not necessarily shown to scale.

In the Figures.

DETAILED DESCRIPTION

Overview of a Printing System

Figure 1:
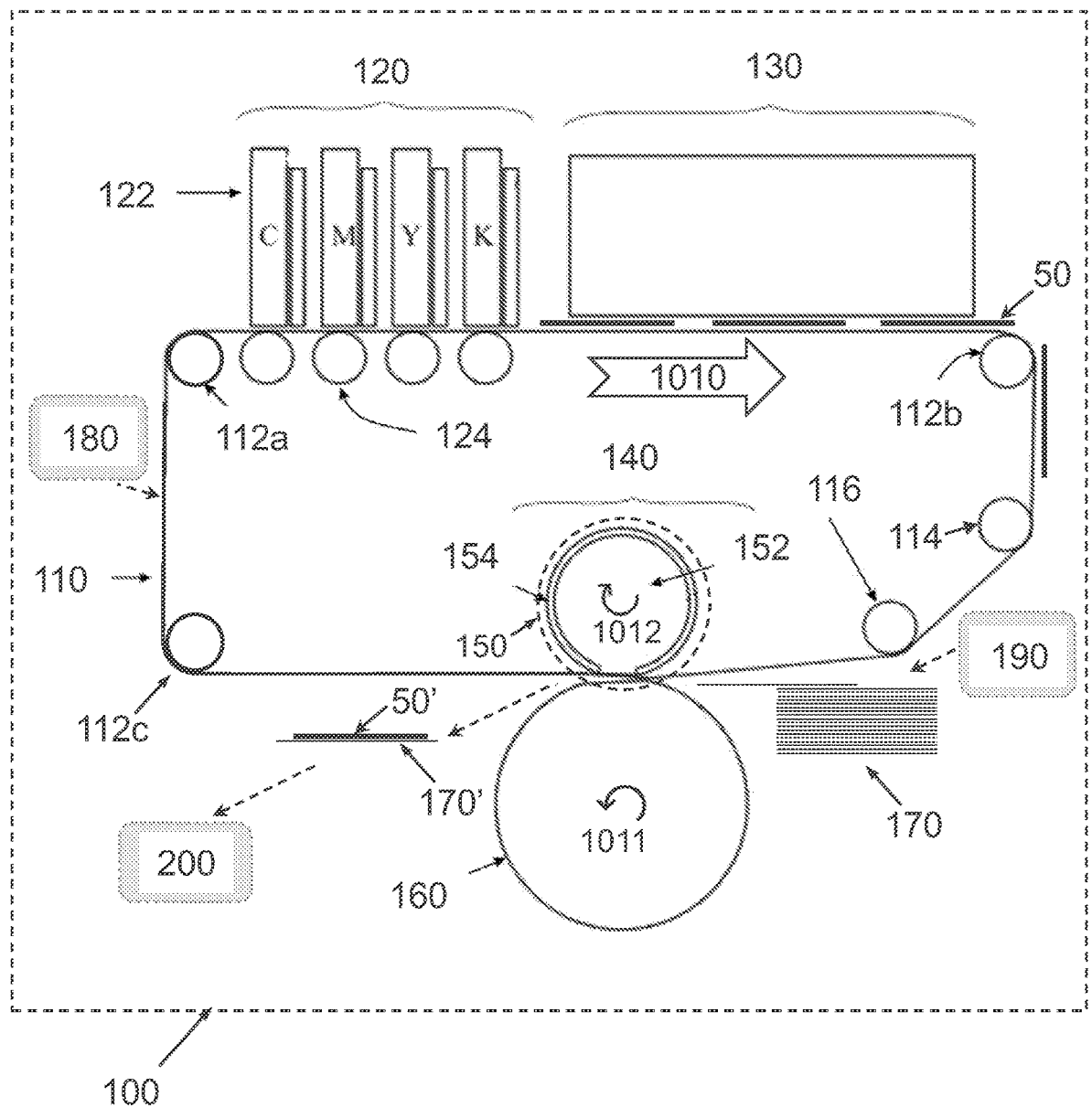
FIG. 1 is a schematic illustration of a printing system where coating compositions according to embodiments of the present invention may be used.

Referring now to the figures, FIG. 1 is a schematic illustration of a printing system 100 for indirect printing in which embodiments of the present invention can be implemented. System 100 being suited for indirect printing, it includes (a) an intermediate transfer member (ITM) 110, presently illustrated as a flexible endless belt. Such ITMs need not be detailed herein and for brevity will be considered to comprise a body (e.g., including a reinforcement or support layer) coated with a release layer (e.g., able to receive the inks forming the ink image and later release it, by transfer to the printing substrate).

ITM 110 can be mounted over a plurality of guide and/or drive rollers 112a, 112b, 112c, 114, and 116. This figure shows aspects of a specific configuration relevant to discussion of the invention, and the shown configuration is not limited to the presented number and disposition of the rollers, nor is it limited to the shape and relative dimensions, all of which are shown here for convenience of illustrating the system components in a clear manner. In the example of FIG. 1, the ITM 110 rotates in the clockwise direction relative to the drawing, as indicated by arrow 1010. This direction can also be referred to as the "printing direction".

The printing system 100 further comprises:

(b) an image forming station 120 comprising, in the present illustration, four print bars 122a-122d (each designated one of C—for Cyan, M—for Magenta, Y—for Yellow and K—for Black). The image forming station 120 is configured to form ink images 50 (only a few of which being shown) upon a surface of the ITM 110 (e.g., on a release layer thereof). The ink image can be formed by any manner adapted to the printing system being considered and, for instance, can be formed by deposition (e.g., ink-jetting) of ink droplets on the ITM surface;

(c) a drying station 130 for drying the ink images; and (d) an impression station 140 where the ink images 50 are transferred from the surface of the ITM 110 to a substrate 170 by pressing the ITM and the substrate one against the other.

The substrate 170 is shown as sheet-fed substrate, such as paper or carton product, but it can alternatively be a continuous-feed (web) substrate. The ink image having transferred to the printing substrate can be referred to as 50' and a substrate to which such a transferred image is attached, in other words a "printed substrate", can be referred to as 170'. The substrate transport system conveying the substrate from a feeding end to a delivery end is not shown in the figure.

In the particular non-limiting example of FIG. 1, the impression station 140 comprises an impression cylinder 160 and a pressure cylinder assembly 150 which includes a pressure cylinder 152 and optionally a compressible blanket 154 disposed at least around a large portion of the circumference of the pressure cylinder. The impression cylinder 160 is rotatable in the direction indicated by arrow 1011. The pressure cylinder 152 can rotate synchronously with the impression cylinder 160 but in the opposite direction, as shown by arrow 1012. As is known in the art, the respective rotation of the cylinders forming the impression station (e.g., 160 and 152) can be synchronized through the use of gears and/or bearers on the corresponding cylinders. When the cylinders of the impression station are engaged with one another (urged one against the other), the line of contact between the two may be referred to as the "impression nip". Disengagement may be achieved by increasing the distance between the axes of rotation of the cylinders, for instance, by lifting-up the pressure assembly 150. Alternatively, the axes of rotation of the cylinders may remain at a same spacing enabling contact, however at least one of the cylinders include a gap or recess in its outer cylindrical surface, so that as the gap reaches the nip, contact cannot be made with the circumference of the facing cylinder (or recess therein).

The skilled artisan will appreciate that not every component illustrated in FIG. 1 is required. Also, it can be appreciated that such a printing system can include additional features and components such as, for example, a different number of components in the previously described stations (e.g., different number of print bars in the imaging station, such as from a single print bar to eight print bars, each able to deposit a same or a different color of ink). When the printing system is adapted for performing duplex printing (i.e. printing a second image on the second side of a substrate printed on its first side), the system may include an additional substrate transport system allowing to feed the substrate to the impression station so that its other side may contact the ink image. Alternatively, the printing system may include a second impression station (hence, a second ('perfecting') impression cylinder) for that purpose.

Alternatively or additionally, the printing system may include additional stations, such as a conditioning station, a cooling station or a cleaning station, to respectively treat, cool or clean the surface of the ITM, if desired, or stations either pre-treating the substrate before transfer of an ink image thereto or finishing the printed substrate (e.g., by varnishing, creasing, folding, stapling and like activities). The optional stations adapted to modify ITM 110, or any property relating thereto, are schematically represented by dashed box 180. The optional stations adapted to modify substrate 170, or any property relating thereto, prior to the transfer of an ink image 50 are schematically represented by substrate pre-treatment station 190. The optional stations adapted to modify a printed substrate 170' are schematically represented by finishing station 200.

Figure 2:
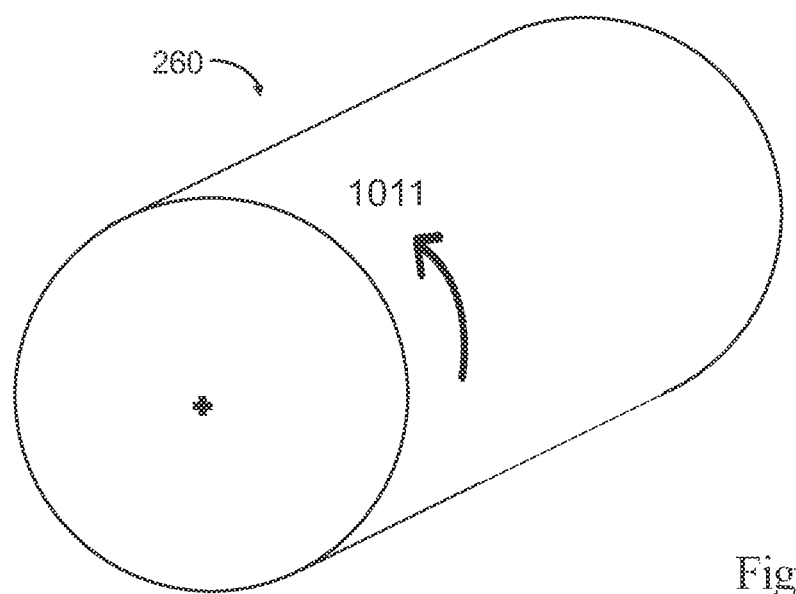
FIG. 2 is a schematic illustration of an impression cylinder which may be coated by coating compositions according to embodiments of the present invention.

Referring now to FIG. 2, an impression cylinder 260 is schematically depicted and presented in perspective view. During operation of the printing system 100, the impression cylinder may rotate around its longitudinal axis in counterclockwise direction indicated by arrow 1011. Such an impression cylinder 260, the circumference of which being an uninterrupted circle, may be suitable for the transfer of ink images from an ITM to a continuous substrate. It is adapted, for instance, for impression to paper or plastic foil web being fed to an impressions station 140 including said impression cylinder by a roll-to-roll substrate transport system. Impression cylinders, such as depicted by 260, can also be referred to herein as "continuous impression cylinders".

A coating composition according to the present teachings can be directly applied to the surface of continuous impression cylinder 260 or can be applied to the surface of an optional continuous sleeve (260' not shown in the figure) mounted on the impression cylinder so as to envelop the surface coming into contact with the ITM and/or printing substrate. Such direct or indirect application of the coating composition, respectively to the outer surface of 260 or 260', can be made by any suitable coating method (e.g., spraying, knife coating, squeeging, rolling, painting, brushing, dipping, printing, etc.). When desired, while less preferred, the surface of the impression cylinder 260 or of the sleeve 260' mounted thereon can first be coated with a priming composition, then with the coating composition of the invention, the priming composition optionally facilitating the adhesion of the coating composition to the underlying cylindrical surface. Alternatively, the coating of surface can be preceded by a physical treatment of the surface to which the coating application is to be applied. For instance, the surface can be pre-treated by sanding, by etching or by flame.

As shall be detailed in a following section, the coating can be formed by applying a composition having a sufficiently high viscosity such that the applied coating composition does not run soon after it is applied or during its curing. At the same time, the viscosity of the coating composition should be sufficiently low to permit easy application by the method elected for coating and/or self-levelling of the composition on the surface being coated. Regardless of the method of application and underlying surface, the composition can then be cured to form a protective coating.

Figure 3:
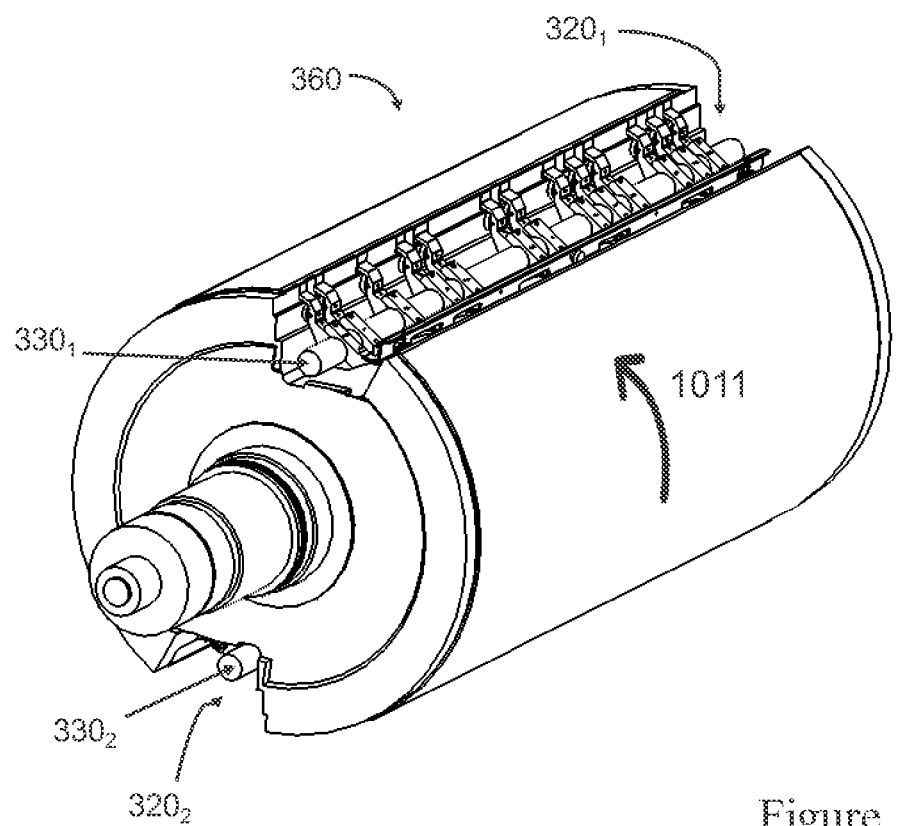
FIG. 3 is a schematic illustration of an alternative impression cylinder which may be coated by coating compositions according to embodiments of the present invention.

Referring now to FIG. 3, an impression cylinder 360, which can be coated with the protective compositions according to some embodiments of the invention, is shown with additional detail. As opposed to impression cylinder 260, cylinder 360 includes a cylinder gap 320. A cylinder gap or recess, as is known in the printing industry, is a discontinuity in the circumference of a printing cylinder for housing and/or anchoring ancillary equipment within the gap. For instance, a cylinder gap 320 may include means for securing articles to the surface of the cylinder, such as grippers for printing substrate or means of releasably attaching jackets protecting the cylinder such as clampers. Typically, the remainder of the cylinder circumference in-between a trailing edge of the gap and a leading edge of the same gap, or of a second gap is continuous and smooth (as the entire circumference of previously discussed impression cylinder 260). Terms such as 'leading edge' and 'trailing edge' wherever used herein are used within a reference framework having a specific direction of movement during operation of the printing system; in this case, the terms are used with reference to cylinder rotation direction 1011.

Impression cylinders, such as depicted by 360, can also be referred to herein as "discontinuous impression cylinders". A discontinuous impression cylinder may comprise one or more cylinder gaps or recesses in its outer cylindrical surface, the surface between any two same or different gaps typically corresponding to the dimensions of a substrate to be carried thereon. Assuming, for illustration, a sheet of B1 paper (707×1000 mm) and an impression cylinder having a length greater than 1 meter to accommodate the length of the substrate, then the inter-gap surface could at least approximately correspond to the width of the substrate (i.e. in the present case, being greater than 707 mm by a few millimeters allowing for margins around the sheet).

The cylinder 360 depicted in FIG. 3 has a first cylinder gap $320_1$ and a second cylinder gap $320_2$. The smooth surface between the cylinder gaps 320 (which can also be referred to as an "inter-gap" surface), may convey substrate 170 as it is fed to the impression nip, where it receives the ink-images 50 transferred from the ITM 110.

As is known in the printing industry, grippers can be used to grip sheets of substrate 170 inter alia on impression cylinders. The grippers, or any other ancillary equipment housed and/or anchored within a cylinder gap 320 are substantially recessed (meaning, in this disclosure: either completely recessed, or at least 90% recessed, or at least 80% recessed) inside the gap so as to substantially not extend or project beyond the circumference of the impression cylinder, were the cylinder devoid of the gap in this segment of its circumference. Taking grippers, for illustration, they may need to mildly protrude (e.g., by no more than 20% or 10% of their height) above the surface of an impression cylinder in order to grip a leading edge of a substrate positioned on its circumference.

One of the reasons for selecting a design with recessed ancillary equipment (e.g., grippers) can be so as to avoid damage or excessive wear of the ITM 110 as it traverses the impression station 140. Another reason can be to avoid damage or misalignment of the ancillary equipment from the same encounter (during every rotation) with the ITM 110 and underlying pressure cylinder assembly 150. The ancillary equipment housed and/or anchored within the cylinder gap is generally composed of a plurality of individuals able to rotate around a same shaft or different corresponding individual shafts or pivots. A first plurality of ancillary equipment $330_1$ recessed with respect to a first cylinder gap $320_1$ and a second plurality of ancillary equipment $330_2$ recessed with respect to a second cylinder gap $320_2$ are shown in FIG. 3. The individuals of the plurality (e.g., of $330_1$ and/or $330_2$) are not necessarily evenly spaced along the length of their respective shaft and/or cylinder gap. The same principles may apply to grippers of printing substrates or securing-means for replaceable cylinder jackets.

Figure 4:
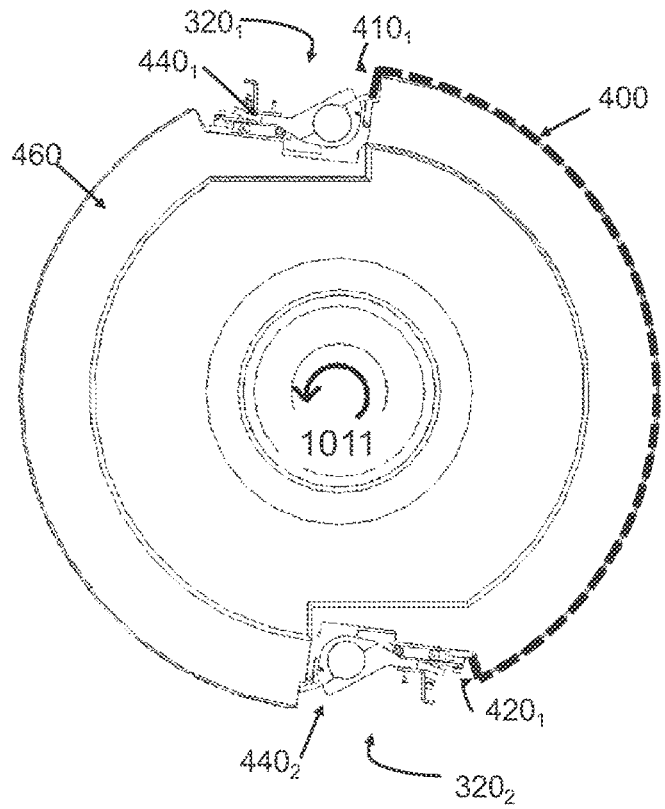
FIG. 4 is a schematic illustration of a further alternative impression cylinder which may be coated by coating compositions according to embodiments of the present invention.

As is known in the printing industry, cylinder jackets can be provided to cover a surface of a cylinder, including substrate transport cylinders such as impression cylinders and perfecting cylinders. FIG. 4 shows another view of an impression cylinder 460 with a jacket 400 attached on one side of the cylinder, covering the cylinder surface on one smooth circumferential surface between cylinder gaps $320_1$ and $320_2$. While in FIG. 3, the plurality of auxiliary equipment recessed in the cylinder gaps schematically illustrated by $330_1$ and $330_2$ represented grippers for sheet substrate, in FIG. 4 the plurality of auxiliary equipment recessed in the cylinder gaps schematically illustrated by $440_1$ and $440_2$ represents securing-means for replaceable cylinder jacket 400. As depicted, the cylinder jacket 400 has a leading edge $410_1$ and a trailing edge $420_1$ each of which can be folded (bent/inwardly turned) to be inserted in respective cylinder gaps $320_1$ and $320_2$, where respective jacket securing-means of the pluralities $440_1$ and $440_2$ can ensure releasable attachment of the folded edge of the jacket to a portion of the inner wall of the cylinder gaps. The foldable leading edge $410_1$ and trailing edge $420_1$ of the jacket 400 need not be a solid strip and can alternatively comprise multiple portions similar to tabs. Jacket-securing arrangements need not be detailed herein, but can, for illustration, be mountable within the recess so as not to project beyond the outer surface of the cylinder when the jacket is secured thereto, and include a clamping lever pivotable about a shaft located within the recess between a clamping position in which the edge of the replaceable jacket is clamped between the lever and a side wall of the recess and a release position in which the lever is spaced from the side wall of the recess, a magnet, for instance, being provided to retain the lever in the clamping position.

The drawings of FIG. 5 schematically illustrate on which surfaces of a cylinder of a printing system (e.g., an impression cylinder, a perfecting cylinder, or any other substrate transport cylinder) coating compositions according to the present invention may be applied. The invention is not limited to the shapes and relative dimensions depicted in the different panels of the figure, all of which being shown here for convenience of illustrating the disposition of the protective coatings in a clear manner.

Figure 5A:
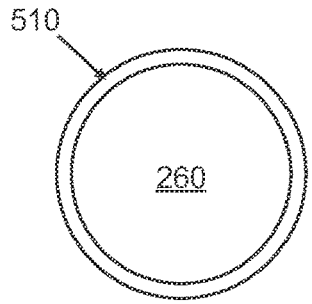
FIG. 5A is a schematic illustration of a protective coating as applied onto an impression cylinder according to one embodiment of the present invention.
Figure 5B:
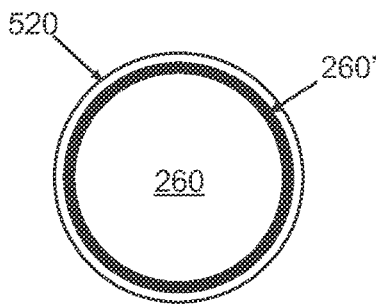
FIG. 5B is a schematic illustration of a protective coating as alternatively applied onto an impression cylinder according to another embodiment of the present invention.
Figure 5C:
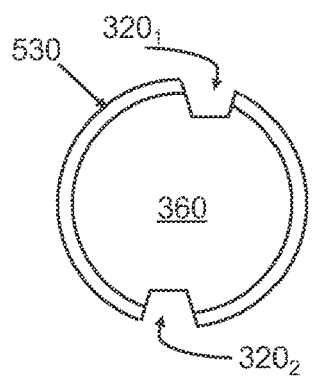
FIG. 5C is a schematic illustration of a protective coating as further alternatively applied onto an impression cylinder according to another embodiment of the present invention.
Figure 5D:
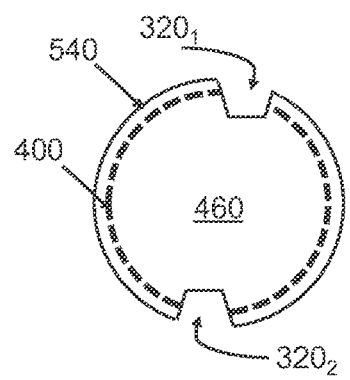
FIG. 5D is a schematic illustration of a protective coating as yet further alternatively applied onto an impression cylinder according to another embodiment of the present invention.

FIG. 5A illustrates how a coating composition can be applied on the entire circumference of a continuous cylinder 260 to form (once cured) a protective coating 510. FIG. 5B illustrates how a coating composition can be applied on the entire circumference of a sleeve 260' mounted on a continuous cylinder 260, the cured composition forming a protective coating 520. FIG. 5C illustrates how a coating composition can be applied on the smooth surfaces in-between cylinder gaps $320_1$ and $320_2$ of a cylinder 360, the auxiliary equipment housed and/or anchored within the gaps not being shown in this figure. The coating composition cured on such surface form a protective coating 530. It can be readily appreciated that while the coating composition can also be applied to the inner walls of the cylinder gaps, this is not essential to the effect sought with respect to prevention of contamination resulting from contact. FIG. 5D illustrates how a coating composition can be applied on jackets 400 secured to a cylinder 460 by way of plurality of securing means $440_1$ and $440_2$ (not shown) housed and/or anchored within cylinder gaps $320_1$ and $320_2$. The coating composition cured on such surface form a protective coating 540. As mentioned, a priming composition (not shown in the figures) may, in some embodiments be applied prior to the application of the coating composition to the foregoing surfaces as above-detailed.

The configuration depicted in FIG. 5D can advantageously be performed before replaceable jackets 400 are secured to the cylinder 460. For instance, the coating composition can be applied to jacket 400 while in planar (unbend) form (its leading and trailing edges being optionally already pre-folded to facilitate their insertion in the cylinder gaps 320) then cured, and only then installed on the cylinder. Moreover, the use of jackets may facilitate the maintenance or replacement of the protective coating, if and when desired. Similar, considerations may be valid to coating compositions applied to sleeves, even though such surfaces would not form a single plan.

Coating Compositions

Reverting to the characteristics that may be required from a coating composition and finished coating resulting therefrom, by way of example, if the coated parts are to operate at elevated temperatures (e.g., of at least 40° C., at least 60° C., at least 80° C., at least 100° C., at least 120° C., or at least 140° C.), then the coating need be resistant to such temperatures (e.g., remaining functional, chemically stable, dimensionally stable, etc.). In such case, the coatings should preferably display a coefficient of thermal expansion adapted (e.g., similar) to their underlying support, being either greater or equal to the coefficient of thermal expansion of the coated surface. The coating should additionally be able to withstand the mechanical stresses to which the coating would be subjected during operation of the (e.g., printing) apparatus. For instance, as the coated parts may frequently or continuously be contacted by a printing substrate, while the system operates, then the coating need be resistant to abrasion, scratches or any other such deformation of the coating outer contacting surface. The coating should additionally be able to withstand the chemical stresses to which the coating would be subjected during operation of the printing apparatus. For instance, as the coated parts would be exposed to the chemical environment resulting from the printing process, and in particular to the ink images and to the inks, or any other chemical composition used in the process, then the coating need be inert (e.g., non-reactive and resistant) to all forms of compositions (including cleaning solutions) that may contact its outer surface. The afore-mentioned examples are non-limiting and a person skilled in the printing industry may readily appreciate additional qualities that may be required from a particular coating for a particular part of a particular printing process.

Moreover, for the present purposes, the coating should additionally be able to prevent or reduce the adhesion of ink images, inks, or residues thereof to its outer surface. In other words, the coating outer surface should promote the release of any ink images, and all portions thereof, so that when a printing substrate bearing an ink image contacts such a coating, the ink image entirely remains on the substrate, not forming residues on the coating. Similarly, if inks or residues thereof unintentionally deposit on surfaces lacking the presence of a substrate (e.g., lack of correct registration leading to partial ink transfer to margins out of substrate coverage), such buildups should preferably be readily removable. Such an advantageous coating (preventing or reducing undesired adhesion of residues of ink images or inks) can be referred to as a "non-sticky coating".

While for some uses, protective coatings need not be particularly limited in their thickness (e.g., being of 1 mm or less, or 100 μm or less), for some applications relatively thin coatings are preferred. For instance, when the protective coating is to be used at a nip having a relatively low tolerance to variability in spacing with a facing surface (and/or a relatively low compressibility compensating for minor variations, for instance by way of a compressible blanket on a pressure cylinder and/or a compressible layer within the ITM structure), then it can be advantageous for the protective coating (in its fully cured form) to have a thickness not exceeding 50 μm. In some embodiments, the cured protective coatings have a thickness of 20 μm or less, or 10 μm or less, or 8 μm or less. In some embodiments, the cured protective coatings have a thickness of 1 μm or more, or 2 μm or more, or 3 μm or more.

Commercially available compositions may exist providing one or more of the above desiderata, but hardly all, not necessarily for the relevant surfaces to be coated, and rarely for a duration of time compatible with commercial settings of printing systems. While one may believe that combining compositions each providing for a distinct property, or subset of properties, may result in a mixture having all desired properties, this is not necessarily the case. Taking for illustration a mixture of two different compositions, the "addition" of a first property from a first composition to a second composition having a second property, may result in a mixture having diminished combined properties, one composition undermining the potency of the other, or both annihilating one another. This may occur, for instance, when the different compositions forming the mixture react with one another, the resulting product being "inactive" or less potent than any one of its constituents. Similarly, when the different compositions are in distinct phases (e.g., each separately as liquids or solids) and/or non-miscible with one another (e.g., each separately in aqueous or oil phase, or each in a separate oil phase compartment), the mixture may be less potent than expected from the combination of the properties supposedly contributed by each constituent.

It is to be noted that such biphasic mixtures impose an additional obstacle to the preparation of coating compositions. Namely, a fundamental aspect for any coating composition, regardless of the additional properties which may be desired to ensure a finished coating formed therewith would suit a particular printing process, is the ability of the coating composition to form an even layer on the surface to be coated. In other words, the coating composition must be able to wet the surface to be coated (e.g., to uniformly spread thereupon). Compositions (or mixtures thereof) that would bead on a surface are not expected to be capable of forming a continuous/even layer on the surface. Similarly, biphasic compositions (e.g., dispersions of solid particles in a liquid or emulsions (e.g., oil-in-water O/W, water-in-oil W/O or oil-in-oil O/O)) are less likely to achieve uniform coating than monophasic wetting compositions (e.g., a hydrophobic liquid applied on a hydrophobic surface having an inferior surface tension). As used herein, the term "biphasic" does not intend to capture compositions including exactly two-distinct phases, but more generally compositions in which at least two of its constituents are substantially not miscible one with another, so that the entire composition is to be found in at least two distinct phases (e.g., dispersions or emulsions) or two distinct compartments of a similar phase (e.g., oil-in-oil emulsions). Without wishing to be bound by any particular theory, biphasic compositions are expected to be more erratic with respect to the uniformity of the coating both physically (e.g., thickness) and functionally (e.g., the properties provided by each of the constituents of the composition being conceivably randomly distributed across different phases). Such possible heterogeneity of the coating composition transpires in the finished coating.

When the printing system is operating under demanding conditions (e.g., high throughput), satisfactorily balancing the above-mentioned properties desirable for a coating, such as the need for "mechanically robust" coatings (e.g., abrasion resistant) and the desire for a non-sticky coating, while additionally fulfilling the crucial demand of forming a uniform coating, may prove particularly challenging.

The present inventors have discovered that specific mixtures may provide for suitable coating compositions. In some embodiments, the coating composition according to the present teachings is a reactive coating composition able to cure (in other words, capable of forming a three-dimensional network by cross-linking between relevant moieties of the composition's constituents). In some embodiments, the coating composition is a condensation curable composition. In some embodiments, the condensation curable composition is curable (or cured) at at least one temperature in the range of 25° C. to 250° C., or at least one temperature in the range of 50° C. to 250° C., or at least one temperature in the range of 100° C. to 250° C., or at least one temperature in the range of 150° C. to 250° C., or at least one temperature in the range of 200° C. to 250° C. In some embodiments, the condensation curable composition is curable (or cured) at a relative humidity (RH) in the range of 30% to 90%, or in the range of 30% to 80%, or in the range of 30% to 70% RH, or in the range of 40% to 60% RH, the relative humidity being measured with suitable instruments at the curing temperature.

In some embodiments, the coating composition is curable through condensation of silanol groups present on two or more compounds included in the composition. Silanol groups (having Si—O—H connectivity) can also be referred to as silanol moieties or silanol functions. Compounds including silanol are often considered water-sensitive, uncontrolled hydrolysis of this moiety eventually leading to premature self-curing, and they are therefore typically supplied tightly sealed under air deprived or inert atmosphere. Reaction (e.g., condensation curing) between one or more different silanol-functional compounds is accordingly considered moisture-sensitive.

In some embodiments, the condensation curable composition comprises or includes a reactive polydimethylsiloxane (PDMS). In some embodiments, the reactive PDMS is silanol-terminated polydimethylsiloxane.

In some embodiments, the silanol-terminated PDMS has an average molecular weight (MW) of at least 400, or at least 700, or at least 2,000, or at least 4,000, or at least 10,000 g/mol.

In some embodiments, the silanol-terminated PDMS has an average molecular weight (MW) of at most 20,000, or at most 5,000, or at most 3,500, or at most 1,500, or at most 700 g/mol. In some embodiments, the silanol-terminated PDMS has an average molecular weight (MW) in the range of from 400 to 20,000 g/mol, or 400 to 4,000 g/mol, or 400 to 2,000 g/mol, or 700 to 3,500 g/mol, or 700 to 1,500 g/mol, or 1,500 to 3,500 g/mol, or 3,500 to 5,000 g/mol, or 5,000 to 10,000 g/mol, or 10,000 to 20,000 g/mol.

In some embodiments, the silanol-terminated PDMS has a weight by weight percentage (wt. %) of silanol groups within the molecule of at least 0.1 wt. %, or at least 0.5 wt. %, or at least 1 wt. %, or at least 2 wt. %, or at least 3 wt. %, or at least 4 wt. %. In some embodiments, the silanol-terminated PDMS has a silanol content of at most 8 wt. %, or at most 5 wt. %, or at most 2 wt. %, or at most 1 wt. %. In some embodiments, the silanol content in the silanol-terminated PDMS is in the range of from 0.1 to 8.0 wt. %, 0.5 to 7.5 wt. %, 0.5 to 5.0 wt. %, 1.0 to 5.0 wt. %, 2.0 to 5.0 wt. %, 2.0 to 4.0 wt. %, 3.0 to 4.0 wt. %, or 3.0 to 7.5 wt. %.

In some embodiments, the silanol-terminated PDMS has a silicon (Si) content of 30.0 wt. % or more, 32.5 wt. % or more, 35.0 wt. % or more, or 37.5 wt. % or more. In some embodiments, the silanol-terminated PDMS has a silicon (Si) content of 45 wt. % or less, 40 wt. % or less, or 38 wt. % or less. In some embodiments, the silanol-terminated PDMS has a silicon (Si) content in the range from 30 wt. % to 45 wt. %, or from 35 wt. % to 40 wt. %, from 35 wt. % to 38 wt. %, from 35 wt. % to 37 wt. %, from 36 wt. % to 38 wt. %, or from 36.5 wt. % to 37.5 wt. %.

The viscosity of the coating composition depends inter alia on the viscosity of its constituents and on their relative proportions, so that subject to its absolute concentration (e.g., in wt. %) in the final coating composition, the silanol-terminated PDMS may display a wide range of viscosities. In some embodiments, the viscosity of the silanol-terminated PDMS is of 1,000 millipascal-seconds (mPa·s) or less, 750 mPa·s or less, 500 mPa·s or less, 200 mPa·s or less, 100 mPa·s or less, 50 mPa·s or less, or 35 mPa·s or less. In some embodiments, the viscosity of the silanol-terminated PDMS is of 15 mPa·s or more, 35 mPa·s or more, or 45 mPa·s or more, 90 mPa·s or more, 120 mPa·s or more, 200 mPa·s or more, or 700 mPa·s or more. In some embodiments, the viscosity of the silanol-terminated PDMS is in the range of 15 mPa·s to 1,000 mPa·s, 15 mPa·s to 800 mPa·s, 20 mPa·s to 500 mPa·s, or 20 mPa·s to 200 mPa·s, 30 mPa·s to 150 mPa·s, or 30 mPa·s to 100 mPa·s.

In some embodiments, the silanol-terminated PDMS is at least one PDMS selected from the group consisting of DMS-S12 (having a viscosity of 16-32 mPa·s), DMS-S14 (having a viscosity of 35-45 mPa·s), DMS-S15 (having a viscosity of 45-85 mPa·s), DMS-S21 (having a viscosity of 90-120 mPa·s) and DMS-S27 (having a viscosity of 700-800 mPa·s) supplied by Gelest; PDMS 481939 (having a viscosity of 15-35 mPa·s), PDMS 481955 (having a viscosity of 55-90 mPa·s), and PDMS 481963 (having a viscosity of about 750 mPa·s) supplied by Sigma Aldrich under CAS No. 70131-67-8; compounds of the Polymer OH series of Evonik having similar viscosities; SiSiB® OF0025 Fluid (having a viscosity of 20-30 mPa·s), SiSiB® OF0156A Fluid (having a viscosity of 60-70 mPa·s), SiSiB® OF0156B Fluid (having a viscosity of 95-105 mPa·s) and SiSiB® PF1070-750 (having a viscosity of about 750 mPa·s) supplied by Nanjing SiSiB Silicones; and all equivalent silanol-terminated PDMS that would be commercially available or synthesized using synthetic procedures well known in the art.

In some embodiments, the silanol-terminated PDMS is present in the coating composition in an amount of 20 wt. % or more, 30 wt. % or more, or 40 wt. % or more, by weight of the entire composition. In some embodiments, the silanol-terminated PDMS is present in an amount of 80 wt. % or less, 70 wt. % or less, or 60 wt. % or less, by weight of the entire composition. In some embodiments, the silanol-terminated PDMS is present in a range from 20 wt. % to 80 wt. %, 30 wt. % to 70 wt. %, or 40 wt. % to 60 wt. %, by total weight of the composition.

In some embodiments, the condensation curable coating composition further comprises or includes a curing agent being at least one of a cross-linker and a catalyst, the curing agent being selected and adapted to cure the condensation curable composition providing for the coating.

In some embodiments, the cross-linker suitable for the condensation curable coating compositions according to the present teachings, in other words comprising two or more functional groups capable of undergoing chemical reaction (cross-linking) with the PDMS and resins disclosed herein, is selected from the group consisting of methylsilicate (tetramethoxy-silane, CAS No. 681-84-5, $Si(OCH_3)_4$); ethylsilicate (tetraethoxy-silane, CAS No. 78-10-4, $Si(OC_2H_5)_4$); polymethylsilicates; polyethylsilicates; and combinations thereof.

By "polymethylsilicate" it is meant oligomers of methylsilicate, having the formula $(CH_3O)_{u3}Si-[O-Si(OCH_3)2]_m-OCH_3$, where m is an integer between 1 and 15, preferably m is an integer between 1 and 10. By "polyethylsilicate" it is meant oligomers of ethylsilicate, having the formula $(C_2H_5O)_3Si-[O-Si(OC_2H_5)2]_m-OC_2H_5$, where m is an integer between 3 and 20, preferably m is an integer between 5 and 15. Suitable such crosslinkers that are commercially available include PSI-023 and PSI-026 (Gelest) and Ethylsilicate 48 and Methylsilicate 51 (Colcoat), but any other equivalent compounds that would be commercially available or synthesized using synthetic procedures well known in the art would be appropriate.

In some embodiments, the cross-linker consists essentially of tetraethoxysilane and/or polyethylsilicates in an amount between about 0.1% and about 15% by weight of silanol-terminated PDMS.

In some embodiments, a condensation curable coating composition according to the present teachings further comprises a catalyst suitable for catalyzing the crosslinking of the curable polymer composition, preferably a condensation-cure catalyst.

In some embodiments, the condensation curable coating composition includes a single type of catalyst. In some embodiments, the condensation curable coating composition includes a combination of at least two different catalysts.

In some embodiments, a catalyst suitable for the condensation curable coating compositions according to the present teachings is selected from the group consisting of tin catalysts, titanate catalysts, zinc catalysts, iron catalysts, chelate titanium, and mixtures thereof.

In some embodiments, the condensation-cure catalyst is a tin catalyst. In some such embodiments, the condensation-cure tin catalyst can be selected from the group consisting of dibutyltin bis (acetylacetonate) (CAS No. 22673-19-4), dioctyltindilaurate (CAS No. 77-58-7), stannous octoate (CAS No. 301-10-0), and dioctyltin bis (acetylacetonate) (CAS No. 54068-28-9), and combinations thereof. Such tin catalysts are commercially available, for instance, from Sigma Aldrich as Product No. 520586 (CAS No. 22673-19-4), Product No. 291234 (CAS No. 77-58-7), Product No. 53252 (CAS No. 301-10-0); or from TIB chemicals, such as TK223 dioctyltin bis (acetylacetonate) (CAS No. 54068-28-9). In some embodiments, the condensation-cure catalyst is a titanate including for instance an alkyl titanate catalyst, such as tetraalkyltitanate like tetraisopropyl titanate (CAS No. 546-68-9) commercially available, for instance, from Sigma Aldrich as Product No. 205273, tetrabutyl titanate (CAS No. 5593-70-4) commercially available, for instance, from Sigma Aldrich as Product No. 244112, and tetraoctyl titanate (CAS No. 3061-42-5), or chelate titanium catalyst, such as titanium diisopropoxide (bis-2,4-pentanedionate) (CAS No. 17927-72-9) commercially available, for instance, as AKT855 from Gelest and titanium di-n-butoxide (bis-2, 4-pentanedionate) (CAS No. 16902-59-3), commercially available, for instance, as AKT853 from Gelest.

In some embodiments, the condensation-cure catalyst is a zinc catalyst, such as zinc octoate (CAS No. 136-53-8), zinc neodecanoate (CAS No. 27253-29-8), bis(pentane-2,4 dionato) zinc (CAS No. 14024-63-6), such as commercially available, for instance, as Tib Kat® 620, Tib Kat® 616, Tib Kat® 623, respectively, from TIB Chemicals, and combinations thereof. While specific examples of condensation-cure catalysts are provided herein, any other equivalent compounds that would be commercially available or synthesized using synthetic procedures well known in the art would be suitable.

In some such embodiments, the condensation curable coating composition includes a catalyst in an amount of between about 0.01 wt. % and about 3 wt. %, between about 0.1 wt. % and about 2.5 wt. %, between about 0.1 wt. % and about 1.6 wt. %, between about 0.5 wt. % and about 1.8 wt. % or between about 0.8 wt. % and about 1.2 wt. % of the weight of the silanol-terminated PDMS.

In some embodiments, the coating composition, in addition to the silanol-terminated PDMS and optional curing agent(s) detailed in the foregoing, further comprises or includes a silicone resin. In some embodiments, the silicone resin has an average molecular weight (MW) of at least 500, or at least 1,000, or at least 2,000, or at least 20,000, or at least 200,000 g/mol. In some embodiments, the silicone resin has an average molecular weight (MW) of at most 300,000, or at most 70,000, or at most 7,000 g/mol. In some embodiments, the silicone resin has an average molecular weight (MW) in the range of from 500 to 300,000, 500 to 8,000, 1,000 to 10,000, or 2,000 to 7,000, or 20,000 to 300,000, or 200,000 to 300,000.

In some embodiments, the silicone resin has a low degree of R/Si substitution, where R represents organic groups (e.g., alkyl or aryl groups) attached to the silicone backbone and Si represents the number of silicon atoms in the resin molecule, so that higher cross-linking density can be achieved. Higher cross-linking density of a polymer matrix is expected to provide increased mechanical resistance to the matrix as compared to a polymer matrix having a relatively lower cross-linking density. In some embodiments, the degree of substitution of the silicone resin is so that R/Si is 2.0 or less, 1.8 or less, 1.6 or less, 1.4 or less, 1.2 or less, or 1.0 or less.

In some embodiments, the silicone resin has a silanol content of 0.5 wt. % or more, 1 wt. % or more, 2 wt. % or more, or 3 wt. % or more. In some embodiments, the silicone resin has a silanol content of 10 wt. % or less, 8 wt. % or less, or 6 wt. % or less. In some embodiments, the silicone resin has a silanol content in the range from 0.5 wt. % to 10 wt. %, or from 2 wt. % to 8 wt. %, from 2 wt. % to 6 wt. %, from 2 wt. % to 4 wt. %, from 0.5 wt. % to 2.5 wt. %, or from 1.5 wt. % to 3.5 wt. %.

In some embodiments, the silicone resin has a silicon (Si) content of 10 wt. % or more, 15 wt. % or more, 16 wt. % or more, or 17 wt. % or more. In some embodiments, the silicone resin has a silicon (Si) content of 45 wt. % or less, 35 wt. % or less, 25 wt. % or less, or 20 wt. % or less. In some embodiments, the silicone resin has a silicon (Si) content in the range from 10 wt. % to 45 wt. %, or from 15 wt. % to 30 wt. %, from 15 wt. % to 25 wt. %, from 17 wt. % to 25 wt. %, from 17 wt. % to 20 wt. %, or from 18 wt. % to 20 wt. %.

In some embodiments, the silicone resin has a low phenyl/methyl ratio. A low phenyl/methyl ratio in the resin molecule is expected to provide increased chemical resistance to the matrix with respect to organic solvents that may be found in inks, as compared to a polymer matrix including a resin molecule having a relatively higher phenyl/methyl ratio. In some embodiments, the phenyl/methyl ratio of the silicone resin is 2.8:1.0 or less, 2.4:1.0 or less, 2.0:1.0 or less, 1.6:1.0 or less, 1.2:1.0 or less, 0.8:1.0 or less, 0.6:1.0 or less, 0.4:1.0 or less, or 0.2:1.0 or less.

Depending on the viscosity desired for the final coating composition and on the absolute concentration of the silicone resin in the final coating composition, the resin may display a wide range of viscosities. The silicone resins being typically provided dissolved in a solvent or dispersed in a liquid carrier, the following viscosity values apply to the dissolved/dispersed resins. In some embodiments, the viscosity of the silicone resin is of 2,000 mPa·s or less, 1,000 mPa·s or less, 100 mPa·s or less, 75 mPa·s or less, or 50 mPa·s or less. In some embodiments, the viscosity of the silicone resin is of 5 mPa·s or more, 10 mPa·s or more, or 20 mPa·s or more. In some embodiments, the viscosity of the silicone resin is in the range of 5 mPa·s to 2,000 mPa·s, 5 mPa·s to 1,000 mPa·s, 10 mPa·s to 50 mPa·s, 20 mPa·s to 200 mPa·s, or 200 mPa·s to 1,000 mPa·s.

In some embodiments, the silicone resin is selected from the group consisting of silanol functional silicone resins, in particular solvent-based resins, including Dowsil™ RSN-0431, Dowsil™ RSN-0804, and Dowsil™ RSN-0805 (supplied by The Dow Chemical Company); Bluesil Res 6405 and Bluesil Res 6407 (supplied by Elkem Silicones); and all equivalent silanol functional silicone resins that would be commercially available or synthesized using synthetic procedures well known in the art.

In some embodiments, the silanol functional silicone resin is present in the coating composition in an amount of 10 wt. % or more, 20 wt. % or more, or 30 wt. % or more, by weight of the entire composition. In some embodiments, the silicone resin is present in an amount of 60 wt. % or less, 50 wt. % or less, or 40 wt. % or less, by weight of the entire composition. In some embodiments, the silicone resin is present in a range from 10 wt. % to 60 wt. %, 20 wt. % to 50 wt. %, or 30 wt. % to 40 wt. %, by total weight of the composition. These amounts of silicone resin are calculated based on solid material, in absence of solvent or liquid carrier.

The amounts of silanol-terminated PDMS and of silanol-functional silicone resin are such that when combined one with another (based on solid material) the sum does not exceed 100 wt. % by weight of the total composition. In some embodiments, the combined amounts of solid materials of PDMS and silicone resin does not exceed 95 wt. %, 90 wt. % or 85 wt. %, by weight of the total composition. In some embodiments, the combined amounts of solid materials of PDMS and silicone resin is at least 50 wt. %, at least 60 wt. % or at least 70 wt. %, by weight of the total composition. The complement to 100 wt. % can, for instance, result from the presence of curing agents and/or auxiliary agents.

In some embodiments, the silanol terminated PDMS and the silanol functional silicone resin are present in the coating composition at a weight per weight ratio of 1:0.4 or more, 1:1 or more, or 1.25:1 or more. In some embodiments, the PDMS and the silicone resin are present at a weight per weight ratio of 1:3.5 or less, 1:2.5 or less, or 1:2 or less. In some embodiments, the PDMS and the silicone resin are present at a weight per weight ratio in a range from 1:0.4 to 1:3.5, 1:0.4 to 1:2.5, or 1:0.4 to 1:1.25. The amounts of silicone resin for the calculation of the weight ratio with the silanol-terminated PDMS above-detailed are calculated based on solid material, in absence of solvent or liquid carrier.

In some embodiments, the condensation curable coating composition further comprises or includes, in addition to the silanol-terminated PDMS, the silanol-functional silicone resin, and the optional curing agent, one or more auxiliary agents selected from the group comprising pot life extenders, preservative agents (e.g., bactericides, fungicides), antioxidants, pH modifying agents, rheology modifying agents, emulsifying agents, anti-foaming agents, degassing agents, levelling agents, wetting agents, dispersing agents, charge modifying agents, reinforcement fillers and like materials that enhance the properties of a curable composition, and/or facilitate its application to or curing on an underlying surface, and/or improve the cured coating resulting therefrom. In some embodiments, the condensation curable coating composition further comprises or includes coloring agents which may assist in the detection of the presence of a cured coating and/or of defects thereon. Preferably, any such auxiliary agent, to the extent contributing to a desired feature of the cured coating, should substantially remain in the coating during it use. In other words, such auxiliary agents are selected and adapted not to migrate out or leach out of a cured layer of the composition. Such additives are known to the skilled person, including the amounts in which they can be used, and therefore shall not be further detailed herein.

In some embodiments, the combined amount of silanol moieties in the entire composition is 0.5 wt. % or more, 1.0 wt. % or more, 2.0 wt. % or more, or 3.0 wt. % or more, by weight of the composition in absence of known and/or added solvent or liquid carrier. In some embodiments, the combined amount of silanol moieties in the entire composition is 10 wt. % or less, 8 wt. % or less, 6 wt. % or less, 5 wt. % or less, or 4 wt./% or less, by weight of the composition in absence of known and/or added solvent or liquid carrier. In some embodiments, the combined amount of silanol moieties in the entire composition is in the range from 0.5 wt. % to 10 wt. %, 1 wt. % to 8 wt. %, 2 wt. % to 8 wt. %, 2 wt. % to 6 wt. %, or 2.5 wt. % to 4.5 wt. %, by weight of the composition in absence of known and/or added solvent or liquid carrier.

In some embodiments, the combined amount of silicon (Si) atoms in the entire composition is 10 wt. % or more, 15 wt. % or more, 20 wt. % or more, or 25 wt. % or more, by weight of the composition in absence of known and/or added solvent or liquid carrier. In some embodiments, the combined amount of silicon (Si) atoms in the entire composition is 40 wt. % or less, 35 wt. % or less, 30 wt. % or less, 27 wt. % or less, or 25 wt. % or less, by weight of the composition in absence of known and/or added solvent or liquid carrier.

In some embodiments, the coating compositions described herein may contain one or more solvents, in which the silanol-terminated PDMS and the silanol-functional silicone resin are substantially not miscible (e.g., less than 1 wt. % of the compound dissolving in the solvent) or not fully miscible at their respective concentration therein. Hence, such solvents can also be considered as liquid carriers, and the two terms may be used interchangeably hereinafter. Solvents may be selected from organic solvents including alcohols, such as ethanol, butanol and isopropyl alcohol; ketones such as methyl amyl ketone or methyl ethyl ketone; hydrocarbon solvents such as paraffins; aromatic solvents such as toluene, xylene, ethyl acetate, butyl acetate, n-methyl pyrrolidone, and the like. While not intending to be bound by theory, it is believed that solvents can be effective as a dispersive vehicle prior to curing, assisting in achieving an appropriate viscosity facilitating the application of the coating composition to the desired surface. In some embodiments, solvents may assist in the wetting of the surface by the coating composition. However, after the coating composition has been cured, it can be expected that there is no residual solvent.

In some embodiments, solvents, if any in the condensation curable coating composition, are present in an amount insufficient to cause the miscibility of the silanol-terminated PDMS (relatively non-polar) with the silanol-functional silicone resin (relatively more polar than the PDMS). In some embodiments, the at least one solvent is present in the coating composition in an amount of 40 wt. % or less, 30 wt. % or less, or 20 wt. % or less, by weight of the total composition. In some embodiments, wherein more than one solvent is present in the coating composition, the sum of the amounts of all solvents is 50 wt. % or less, 40 wt. % or less, or 30 wt. % or less, by weight of the total composition.

As mentioned, even if present, solvents should not modify one of the main features of the present coating compositions, namely the fact that its silanol-terminated PDMS and silanol-functional silicone resin constituents are essentially non-miscible one with the other. While minor miscibility cannot be ruled out when these specific constituents are present in particular absolute amounts and/or relative weight ratio, the coating compositions herein disclosed are substantially biphasic with respect to said compounds.

Emulsions are dispersed systems consisting of two or more mutually insoluble or sparingly soluble liquids. One of the liquids is usually present in excess and is termed the continuous or external phase, while the liquid dispersed in it is termed the dispersed, discontinuous or internal phase. If the continuous phase consists of water, and the dispersed phase consists of an organic liquid, such as mineral oil, the term oil-in-water (O/W) emulsion is used. If water is finely dispersed in an organic or non-aqueous liquid, a water-in-oil (W/O) emulsion is produced. If two non-aqueous liquids are emulsified in each other, the term oil-in-oil (O/O) emulsion or dispersion is used, O/O emulsions in which both phases are essentially non-polar being relatively rare. The term "oil" in such definitions generally relate to a non-volatile liquid compound that is not miscible with water. Thus, the silanol-terminated PDMS and silanol-functional silicone resins as used herein may be viewed as oils. In some embodiments, the condensation curable coating compositions of the invention are O/O emulsions or comprise constituents that can form O/O emulsions upon suitable homogenization of the same. Without wishing to be bound by any particular theory, it is believed that the silanol-functional silicone resins constitute the continuous or external phase, while silanol-terminated PDMS constitute the discontinuous or internal phase.

Methods and instruments suitable for the preparation of emulsions are known and typically include, by way of non-limiting example, stirrers; mixers (e.g., planetary mixers); mills such as media mills, roll mills, and colloid mills; homogenizers such as high-shear, high-speed, and high-pressure homogenizers; micro-fluidizers; dissolvers; sonicators; and any other equipment capable of comminuting the dispersed phase by way of physical shear, either in a continuous manner or in batches. Regardless of the emulsifying mean, as afore-exemplified, emulsions can be prepared in more than one step, for instance by using a same apparatus under changing operating conditions or by using a series of different apparatuses, each operated to achieve the desired step outcome. For illustration, a first emulsifying instrument can be used to prepare a preliminary emulsion wherein the dispersed droplet are still relatively large, using for example a high-speed stirrer, then a second emulsifying instrument can be used to further reduce the size of the droplets to their intended range, using for example a high-shear homogenizer.

In some embodiments, the discontinuous phase is dispersed in the continuous phase as droplets having an average diameter of at least 250 nanometer (nm), at least 500 nm or at least 750 nm. In some embodiments, the dispersed droplets of the O/O emulsion forming the coating composition have an average diameter of at most 10 µm, at most 7.5 µm or at most 5 µm. Average diameter of droplets can be measured by any suitable method, for instance by microscopic methods and analysis of images captured by optical microscope or cryogenic transmission electron microscope (cryo-TEM). Such methods are known to the skilled persons and need not be further detailed. Conveniently, diameter of droplets may be determined by routine experimentation using Dynamic Light Scattering (DLS) techniques, where the size is expressed as hydrodynamic diameter. DLS methodology facilitates a more statistical analysis of a population of droplets, the hydrodynamic diameter being often reported for 90% of the population (D90), for 50% of the population (D50), and for 10% of the population (D10) allowing to assess the size distribution of the droplets. Such analysis can be done, for example, in term of number of droplets ($D_N$) or volume of droplets ($D_V$) in the population under study. In some embodiments, the average diameter of the droplets is estimated by the measure of $D_N50$ using DLS.

In some embodiments, the droplets of the O/O emulsion forming the coating composition have a relatively narrow particle size distribution. In some embodiments, the size distribution of the droplets of the internal phase is said to be narrow if a unitless ratio between (a) the difference between the hydrodynamic diameter of 90% of the droplets and the hydrodynamic diameter of 10% of the droplets; and (b) the hydrodynamic diameter of 50% of the droplets, is no more than 2.0, or no more than 1.5, or no more than 1.0. Considering measurements based on the number of droplets in the sampled population, previous sentence can be mathematically expressed by: $(D_N 90 - D_N 10)/D_N 50 \leq 2.0$ and so on.

When using DLS to assess the size distribution of the droplets within the coating composition emulsion, the heterogeneity of the droplet sizes in the sampled population can be assessed by the polydispersity index (PDI) of the sample. For microparticles (e.g., droplets), the PDI of their size can be in a range of 0 to 1, which can be calculated as described in the international standards ISO 22412:2017 and ASTM E2490-09. Some DLS instruments may provide the PDI of the sample in addition to the hydrodynamic diameter of the droplets for any particular percentage of the population. Emulsions having a PDI of 0.7 or less, and in particular a PDI of 0.4 or less, are believed to be more stable (and less poly-dispersed) than emulsions having a PDI between 0.7 and 1.0. In some embodiments, the coating emulsions according to the present teachings are relatively moderately poly-dispersed having a PDI of 0.2 or less, or relatively mono-dispersed, having a PDI of 0.1 or less, 0.09 or less, 0.08 or less, or 0.07 or less.

When light transmission through the O/O emulsion (or via a coating resulting from a curing thereof) is desired, it may be recommended to substantially match (e.g., within ±0.3) the refractive indices of the continuous phase to that of the droplets, in order to minimize scattering. In some embodiments, when light transmission is not a concern, the continuous and dispersed phases have different refractive indices, so that the O/O emulsion forming the coating composition has a turbid appearance. Turbidity of a composition is typically visible to/detectable by the naked eye, but it can be quantitatively measured using a turbidity meter according to standard procedures.

In some embodiments, the condensation curable coating composition is provided as a kit, the silanol-terminated PDMS being in a first part of the kit and the silanol-functional silicone resin being in a second part, the first part and the second part not being miscible with one another. The compartments comprising each of the afore-mentioned first part and second part of the kit are preferably tightly sealed to reduce or prevent moisture-induced curing. In some embodiments, a cross-linker may be present within the part comprising the silanol-terminated PDMS. In some embodiments, the kit may further comprise a third part, including a catalyst suitable for the constituents of the other two parts.

In some embodiments, the protective coating (once cured) provides for a relatively hard outer surface (e.g., having sufficient abrasion resistance). The protective coating is preferably sufficiently hard to be durably operative (e.g., resisting mechanical stresses that may cause its detachment). But it need not be excessively hard, to an extent it could render the coating too rigid or inflexible, in particular when the coating is applied on a surface that is subsequently bended.

In some embodiments, the protective coating (once cured) has a relatively high gloss, having a gloss value between 70 and 100 gloss units (GU), or between 80 and 100 GU, or between 85 and 95 GU, as measured with a glossmeter at an angle of 20°. When applied on shiny surfaces, such as metallic surfaces, higher gloss value can be reported. For instance, a stainless steel surface may display a gloss of about 250 GU, coating having relatively high gloss having accordingly increased values.

In some embodiments, the protective coating (once cured) has a mean areal roughness Sa of 1 μm or less, 800 nm or less, 600 nm or less, 500 nm or less, 400 nm or less, or 300 nm or less. In some embodiments, the mean areal roughness Sa of the protective coating is 50 nm or more, 100 nm or more, or 200 nm or more. In some embodiments, the mean areal roughness Sa of the protective coating is in the range from 50 nm to 800 nm, 50 nm to 600 nm, 50 nm to 500 nm, 100 nm to 400 nm, 200 nm to 400 nm, or 250 nm to 350 nm. Such measurements can be made using a laser scanning confocal microscope or any standard techniques. Advantageously, the roughness of the coating does not exceed the roughness of the surface to be coated by the largest of 10-fold the roughness of the support or a delta roughness of 500 nm or less, and preferably by the smallest of the two values. Taking for illustration, an uncoated stainless steel foil having a mean areal roughness Sa of about 300 nm, then the surface of the coating should have a mean areal roughness Sa not exceeding 3.3 μm (11×300 nm) and preferably being of about 800 nm (300 nm+500 nm) or less.

Figure 6:
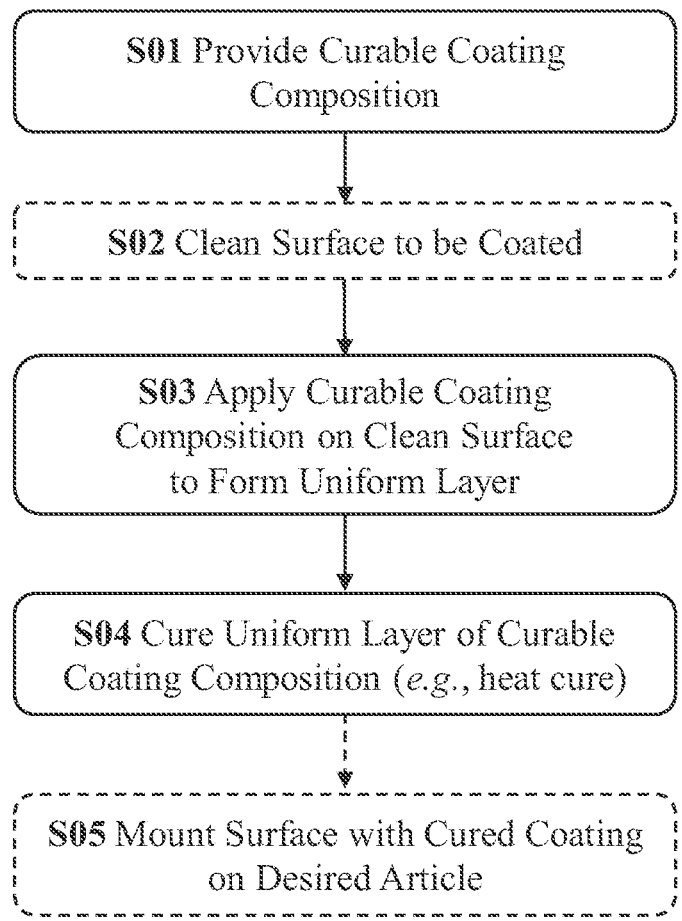
FIG. 6 shows a flowchart of the various methods herein described, according to various embodiments of the present invention.

FIG. 6 shows a flowchart of the various methods herein described, according to embodiments of the present invention. In a first step S01, a condensation curable coating composition is provided, for instance, by being prepared as further detailed herein. In an optional second step S02, the surface to be coated may be cleaned to substantially remove any contaminant (e.g., grease, dust, etc.). This step need not be carried on if the surface to be coated is supplied sufficiently clean. Step S02 can be performed before step S01 (e.g., if the coating composition is ready to use) or in parallel with step S01 (e.g., if involving the preparation of the coating composition). If necessary, step S02 is performed before step S03. In a third step S03, the condensation curable coating composition is applied on the clean surface so as to form a uniform layer (e.g., having an even thickness, devoid of surface defects such as discontinuities, voids, patterns, ridges, orange peel effects etc.). The coating step S03 is performed during the pot life of the condensation curable coating composition (while it is workable). Typically, the coating composition is homogenized before being applied. Application of the coating composition can be by any suitable coating method, including as further detailed herein. The layer of the condensation curable coating composition formed on the surface is then cured in a fourth step S04. Curing can be performed under any condition suitable for the coating composition and the underlying surface. For instance, when curing is performed by application of heat, the curing may take place at more than one temperature, none exceeding the heat resistance temperature of the materials above which they may irreversibly degrade. The temperature may be sequentially increased in a number of steps, as may be deemed suitable, including as further detailed herein. The curing step is performed until the curable coating composition is fully cured, at which time the surface and the protective coating are allowed to cool down to room temperature. To the extent that the coated surface is not integral to the article, a surface of which is to be coated, the coated surface can, in an optional fifth step S05, be mounted (e.g., attached and preferably in a releasable manner) to the desired article. For instance, the above-method can be used to coat a replaceable jacket, thereafter secured to a part of a printing system (e.g., an impression cylinder or plate, or any other article that may come into contact with a printing or printed substrate). Except for the coating and the curing steps, not all steps need necessarily be performed by the same entity and/or at the same premises. For instance, coating of surfaces attachable to distinct articles can be done by a first entity at a first premises, whereas the attachment of the coated and cured surface can be done by a second entity at a second premises.

A number of coating compositions and surfaces coated with cured versions thereof shall be described in the following examples.

EXAMPLES

Example 1: Compositions for Coating

In the present example, a series of compositions was prepared containing different proportions of silanol-terminated PDMS and silicone resin, in presence of condensation curable cross-linker and catalyst, when appropriate. DMS-S14 (CAS No. 70131-67-8, supplied by Gelest) represented a suitable silanol-terminated PDMS and Dowsil™ RSN 0804 (supplied by The Dow Chemical Company) exemplified a silicone resin. A polyethylsilicate, commercially available as Ethylsilicate 48 (CAS No. 68412-37-3 supplied by Colcoat), and dioctyltin dineodecanoate, commercially available as Tib Kat® 223 (CAS No. 54068-28-9 supplied by Tib), respectively served as cross-linker and catalyst.

Seven compositions were prepared according to Table 1, wherein DC804 stands for Dowsil™ RSN 0804, ET48 stands for Ethylsilicate 48 and TK223 stands for Tib Kat® 223. The amounts reported in the table are provided in grams (g) of material "as supplied" and may exceed the actual amount of a material when supplied in diluted form. For instance, as DC804 is supplied as 60 wt. % of solid resin in toluene, 100 g of DC804 corresponds in fact to 60 g of silicone resin. All other materials were supplied undiluted and except for the presence of minor excipients and/or impurities are considered to be 100 wt. % of the amount added to the composition.

TABLE 1

| Material | Coating Composition No. | | | | | | |
|---|---|---|---|---|---|---|---|
| | 1 | 2 | 3 | 4 | 5 | 6 | 7 |
| DMS-S14 | 0 | 20 | 40 | 50 | 60 | 80 | 100 |
| DC804 | 100 | 80 | 60 | 50 | 40 | 20 | 0 |
| ET48 | 0 | 2 | 4 | 5 | 6 | 8 | 10 |
| TK223 | 0.0 | 0.4 | 0.8 | 1.0 | 1.2 | 1.6 | 2.0 |

As can be seen from the table, composition No. 1 and No. 7 are references containing either one or the other of the silanol-terminated PDMS and of the silicone resin, all other compositions (No. 2 to 6) being blends of the two in various ratios.

The compositions were prepared as follows. In a first step, DMS-S14 and DC804 were added to one another in the respective amounts indicated in Table 1. This first blend was mixed for 30 seconds at room temperature (RT, circa 23° C.) in a planetary centrifugal mixer at 2,000 rpm, the mixer being a Thinky Mixer ARE-250 of Thinky Corporation. The catalyst (TK223) was then added to the first blend according to the amounts indicated in the table to form a second blend, which was also mixed for 30 seconds at 2,000 rpm as previously described. Last, the cross linker (ET48) was added and the final blend was mixed under the same conditions to yield the compositions to be tested as coating compositions.

Compositions No. 2 to 6, comprising the various ratios of silanol-terminated PDMS and silicone resin, displayed various degrees of "milky" appearance, supporting the lack of miscibility of these two materials in a single homogeneous phase. The compositions being generally curable, their further processing took place during the time window allowing their workability (e.g., not too viscous), as can readily be appreciated by a person skilled in the art of curable polymer matrices.

Example 2: Coating and Curing

In the present example, the series of compositions prepared according to Example 1 was applied to a test surface. In a first run, the surface to be coated was a foil of ¾-hard stainless steel 301 (an austenitic steel having a Vickers hardness number of 370-390 HB (i.e., a Rockwell C hardness of about 38-41 HRC), a thickness of 0.05 mm (50 μm), a width of 1050 mm and supplied as a coil by Zhanzhi Group). The foil (which contained more than 16 wt. % of chromium and for simplicity will be referred to herein as stainless steel) was cleaned with hexane (technical grade), which was wiped away with a soft, nonabrasive cellulose-fiber wiper, then with isopropyl alcohol (technical grade), which was also wiped away. These solvents were expected to eliminate any organic depot on the surface to be coated. The cleaned foils were typically used within 10 minutes of their cleaning (once the solvents had fully evaporated) to reduce deposition of dust.

The compositions of Example 1 were applied on pieces of clean stainless steel foil, for instance by depositing about 5 g of the composition on one edge of a foil of 100×100 mm, then drawing the composition across the surface of the foil with a wire rod providing for a wet thickness coating of 25 μm, using a control coater K202 from RK Print Coat Instruments. While the compositions were coated within less than 60 minutes from the last mixing step, they were briefly mixed for a few seconds by vortex (Vortex2 from Scientific Industry) before being applied to the surface being coated.

The coated foil was allowed to cure for 1 hour at RT, at which time the coating was sufficiently stable to transfer the foil to a forced convection oven (JSOF-Series from JSR-Forced Convection Ovens) where the temperature was raised to 100° C. for further curing for one more hour, then the temperature was further raised to 150° C. for additional curing for one more hour. The foil and its partly heat cured coating were then transferred to a new pre-heated forced convection oven (Carbolite RF60-FC from MRC) where it was incubated for 2 hours at 200° C. All steps were performed at a relative humidity of more than 30%. Following this series of curing phases, the resulting protective coating was deemed "fully cured".

By "fully cured" it is meant that the polymer matrix forming the coating no longer changes over time suggesting, in other words, that no further cross-linking is taking place. For instance, a polymer matrix resulting inter alia from the condensation of silanol groups would be fully cured, when the number of siloxane bonds it can form in the coating composition and under the curing conditions applicable, or conversely the number of silanol groups that would remain unbound, does not substantially change over time. The number of siloxane bonds and/or of silanol groups in a cured polymer can be assessed by routine analytical methods, such as by Fourier transform infrared (FTIR) spectroscopy. As readily appreciated by a person skilled in the art of curable materials (e.g., condensation curable silicones), "full curing" may be reached before completion of the curing phases previously exemplified, which need not be construed as limiting.

The thickness of the cured coatings was measured using an optical thickness measurement gauge (Elcometer® 415 from Elcometer, UK) and typically found to be of less than 10 μm. Their areal roughness $S_a$ was measured by confocal microscopy and compared to the baseline roughness of the stainless steel foil upon which they were applied and cured. While the stainless steel support displayed on average a roughness of $S_a$ equal to about 225 nm, the cured coatings of the present teachings displayed a higher roughness, the $S_a$ roughness of cured composition No. 4 being, by way of example, of about 539 nm under the present method of its application and curing. It is noted that while the roughness of the coated surface is higher than the roughness of the uncoated surface by about 300 nm, the absolute roughness of the cured coats is still indicative of a relatively smooth surface (e.g., $S_a \leq 1$ μm).

Example 3: Evaluation of Cured Coatings

In the present example, the cured coatings prepared according to Example 2 were assessed for three main properties: a) their ability to sufficiently attach to the surface being coated (e.g., a stainless steel substrate); b) their ability to sufficiently release any depot that may form thereon (e.g., inks); and c) their ability to resist abrasion (e.g., as may result from repeated contact with a printing substrate).

The adhesion to the underlying surface was tested using a Cross Hatch adhesion tester (Elcometer® 107 from Elcometer, UK). Briefly, a cutter having ten blades having dimensions (18 mm long and 1 mm deep) allowing to penetrate through substantially the entire thickness of the cured coating (i.e. about 10 μm) made a series of parallel cuts at a predetermined spacing (having a pitch of about 1.5 mm) on the surface of the cured coatings. The sample was then rotated by 90° and subjected to the same treatment, resulting in the formation of a lattice of perpendicular lines including 81 squares having edges of about 1.5 mm. The network of cut squares was then subjected to vigorous brushing intended to detach any loosely attached square. Debris were removed by compressed air jet and the resulting patterns studied (optionally under a magnifier) for detachment of any of the minute squares of the lattice. The results were graded according to an ISO scale between 0 (best adhesion) and 5 (worst adhesion) according to the following scale. 0: the edges of the cuts are completely smooth and none of the squares of the lattice were detached; 1: minor detachment of squares was observed in less than 5% of the total area of the lattice; 2: the detached area was between 5% and 15% of the total area of the lattice; 2: the detached area was between 15% and 35% of the total area of the lattice; 4: the detached area was between 35% and 65% of the total area of the lattice; and 5: the detached area was greater than 65% of the total area of the lattice.

The releasability of the cured coating was tested by measuring the peeling force (in Newtons) necessary to remove an adhesive tape (Elcometer® 99) previously applied to the surface of the coating. Measurements were made on a tensiometer using a 20 Newton cell by Llyod instrument using Nexygen software. The adhesive tape was peeled from the coating surface at a speed of 400 mm/min, and the force at which the tape fully separated from the coating was recorded. Coatings requiring a relatively low force to peel away the adhesive tape are considered having a higher releasability than coating requiring a relatively higher peeling force to achieve the same.

The ability of the cured coatings to resist abrasion was assessed by measuring the gloss of the coating before and after subjecting it to a rub test. Gloss was measured using a glossmeter Haze Gloss from BYK at 60°, the sample was attached to a plate holder and covered with a piece of paper (laser printing paper) supported by an aluminum block, the paper being rubbed back and forth 500 times over the coating using a Printing Ink Rub Tester ZL-2301 from Dongguan Zhongli Instrument Technology. The loss in gloss was calculated as a percentage difference between the initial gloss and the one measured after the rub test. A relatively low loss in gloss (e.g., a % Δ-gloss of 20% or less, 15% or less, 10% or less, or 5% or less) is indicative of a relatively high abrasion resistance.

For each cured coating evaluated according to the present example, the tests were repeated at least three times and the reported results refer to the mathematical average of these repeats. The results are reported in Table 2, which for convenience also includes the respective amounts (in grams) of silanol-terminated PDMS and silicone resin in the compositions which served for the preparation of the tested coatings. NA means that the results are not available.

TABLE 2

| Composition No. | DMS-S14 | DC804 | Average Peeling Force (N) | Adhesion | Abrasion (% Δgloss) |
|---|---|---|---|---|---|
| 1 | 0 | 100 | 5.773 | 0 | 6.7 |
| 2 | 20 | 80 | 0.247 | 0 | 16.7 |
| 3 | 40 | 60 | 0.119 | 0 | NA |
| 4 | 50 | 50 | 0.047 | 0 | 21.5 |
| 5 | 60 | 40 | 0.063 | 1 | 20.7 |
| 6 | 80 | 20 | 0.052 | 2 | 31.5 |
| 7 | 100 | 0 | 0.038 | 5 | 25.2 |

As can be seen from the above table, the reference compositions provided the most extreme behaviors in the tested series. Namely, a coating consisting of only silicone resin provided for a very good adhesion to the stainless steel surface (i.e., none of the squares of the lattice having detached), a good abrasion resistance (i.e., a low % Δ-gloss), however required the highest peeling force of the series to remove the adhesive tape (i.e. poor releasability). At the other end, a coating consisting essentially of silanol-terminated PDMS and including its curing agents, required the lowest peeling force to remove the adhesive tape (i.e. good releasability), but provided for a very poor adhesion to the stainless steel surface (more than 65% of the total area of the lattice having detached from the surface) and a relatively low abrasion resistance (with a % Δ-gloss of about 25%).

Coating composition No. 4 provided the most balanced results in this series. This outcome is surprising, since as mentioned the materials are not compatible with one another and the "milkiness" (turbidity) of the coating composition suggested that no even coating could be formed therewith. It should be reminded that as DC804 is supplied as 60 wt. % of solid resin in toluene, while DMS-S14 is supplied as essentially 100 wt. % of silanol-terminated PDMS, the coating having comprised the same weight of each commercially available product corresponds in practice to a ratio of 1 silanol-terminated PDMS to 0.6 silicone resin, by weight of the respective molecules. In this particular coating, the cross-linker (ET48 in Table 1) was present at a ratio of 1:10 by weight of the silanol-terminated PDMS, whereas the catalyst (TK223 in Table 1) was present at a ratio of 1:50 by weight of same silanol-terminated PDMS.

In an alternative adhesion test, instead of vigorously brushing the lattice of minute squares, an adhesion tape (ASTM D 3359 Adhesive Tape) was used to assess the attachment of the coating to the surface. The lattice was prepared as previously described and lightly brushed to remove minor debris. A piece of about 8 cm adhesive tape was cut from an inner turn of the tape to ensure maximal adhesion and centered over the lattice. The tape was firmly rubbed (e.g., using a soft fabric) to ensure intimate contact with the coating. Within 5 minutes of its application, the tape was removed by pulling it away at an angle of 60° to the surface in a single smooth action taking approximately up to 1 second. The results were graded as previously detailed and coatings prepared from compositions No. 1 and 4 also achieved a grade of 0 (none of the squares detaching from the surface).

It is important to note that stainless steel is a particularly challenging surface, as far as its coating is concerned. Stainless steel is a steel (ferrous) alloy with highest percentage contents of iron, chromium, and nickel. Chromium, typically providing for at least 10 wt. % of the alloy, contributes to its resistance to corrosion and to its low- to nil-adherence. While the obsolescence of surface coating can be considered an advantage, making stainless steel a material of choice for home use (e.g., cookware), bare surfaces may be problematic in some industrial settings. Considering, for illustration of industrial use, the particular case of a printing system, stainless steel surfaces are expected to be advantageous for surfaces prone to corrosion under the operating conditions of the printing system. But while such material may delay, reduce or prevent corrosion of parts, it may also interact with certain chemicals coming in contact therewith. The interaction need not be covalent to be deleterious and, without wishing to be bound by any particular theory, it is believed that stainless steel may retain ink residues by non-covalent bonding. In such case, coating the stainless steel to prevent or reduce such undesired interactions is highly recommended. However, as can be appreciated by a skilled person, coating of stainless steel can be a demanding process. Therefore, the ability of compositions according to the present teachings to adhere to this relatively problematic surface, which in the present examples includes more than 16 wt. % chromium, suggests that the compositions can be suitable for less demanding materials.

In some embodiments, the coating compositions can be used to coat ferrous metals, non-ferrous metals, and alloys thereof; ceramics; or plastics (treated by corona or plasma to increase adhesion).

Furthermore, it should be noted that the present substrate upon which the coatings were applied, was relatively flexible. Still, creasing or wrapping of the stainless steel did not affect the continuity/uniformity of the best performing cured coatings in the regions being relatively "folded". No cracks nor fissures were visually detected in proximity of the folding line. Moreover, no tear of the cured coating was observed at the edges of the foil, where the probability of this phenomenon occurring is expected to increase. Thus, coating compositions according to the present teachings are expected to be applied with equal success on less flexible/more rigid surfaces, being part of movable or immovable articles. While stainless steel is a relatively non-porous material, the suitability of the present compositions for coating more porous materials is conceivable.

Example 4: Contact Angle Characterization

As the results of Example 3 suggested a relatively high impact of the ratio between the silanol-terminated PDMS and the silicone resin on the performance of a coating resulting therefrom, the purpose of the present example was to study how such ratios may affect the hydrophilic or hydrophobic properties of the cured coating. This surface property was assessed by contact angle measurements.

Briefly, a droplet of 2 µl of distilled water was deposited on the surface being tested and the advancing contact angle between the droplet and the surface measured at RT using Contact Angle analyzer—Kruss™ "Easy Drop". At least three repeats were performed for each surface and the results reported in Table 3 correspond to the average of these repeat measurements, the standard deviation (SD) being also reported, as well as the relative deviation conferred by each coating (being the percentage of SD to mean values of the surface). Two surfaces were included in the study for reference. The first one was the surface of the uncoated stainless steel foil upon which the various coating compositions were applied and the second one was a monophasic bi-component addition cured silicone polymer (LSR 2530 of Momentive, cured according to the manufacturer instructions). The weight (in grams) of each of the silanol-terminated PDMS and the silicone resin in the compositions having served to prepare the surfaces being tested are reminded for convenience.

TABLE 3

| Surface | DC804/DMS-S14 | Mean Contact Angle | SD | % SD/Mean |
|---|---|---|---|---|
| Stainless steel | Not Relevant | 81.1° | 1.90° | 2.34% |
| Composition No. 1 | 100/0 | 90.9° | 0.71° | 0.78% |
| Composition No. 4 | 50/50 | 96.5° | 1.35° | 1.40% |
| Composition No. 7 | 0/100 | 106.0° | 1.59° | 1.50% |
| Addition Cure Silicone | Not Relevant | 110.8° | 3.07° | 2.77% |

A surface providing a contact angle of 90° or less is considered hydrophilic (the water droplet having a tendency to spread on it) and a surface providing a contact angle of 90° or more is considered hydrophobic (the water droplet having a tendency to bead on it). As can be seen from the above table, while all coatings decreased the hydrophilicity of the stainless steel support, a coating consisting essentially of the silanol-functional silicone resin (Composition No. 1) only achieved borderline outcome)(90.9°±0.71°. Increasing the relative amount of silanol-terminated PDMS in the coating composition further shifted the properties of the surface towards hydrophobicity. Relative hydrophobicity of a protective coating is expected to reduce the risk of undesired attachment to the surface of such coating.

It is to be noted that while contact angle measurements are typically intended to assess the hydrophobicity/hydrophilicity of a surface, such measurements may also be indicative of the uniformity of the surface. As mentioned, contact angle measurements are generally performed at least at three distinct points on a surface, the results provided being the average of these measurements. Results are generally considered representative if the variation (e.g., standard deviation or standard error) between the measurements is relatively low, for instance within ±20% of the mean value). By increasing the number of points being sampled to at least 5 points, at least 10 points, or at least 15 points, or at least 20 points, the variation between the points may in itself become informative. A relatively low variation (i.e., a relatively high repeatability of the measured values) may indicate that the surface providing such outcome is more uniform (e.g., smooth, flat, substantially defect-free—substantially devoid of defects on the surface (e.g., protrusions or craters caused by bubbles, pin holes, orange peel or other like surface flaws, and/or defects caused by contaminants) than a surface yielding a relatively higher variation. While a standard deviation (SD) or standard error (SE) of a set of measurements within ±20% of the mean value is considered satisfactory with respect to the representability of the average results, a SD and/or SE within narrower range (e.g., within ±10% or within ±5%) are suggestive of a relatively high uniformity of the surface.

While no statistical analysis was performed, the results of Table 3 suggest that the protective coatings prepared according to the present teachings were relatively more uniform than the two reference surfaces. Compositions Nos. 1, 4 and 7 displayed on average SD values deviating from their respective means by about 1.2%, whereas the uncoated surface or a surface coated with a distinct coating displayed on average a two-fold higher outcome of 2.6%. This relatively high uniformity of the coatings according to the invention is worth mentioning in view of the fact they were achieved (see, Composition No. 4) by mixing materials residing in distinct compartments of oil phases, thus expected to yield heterogeneous results, if any.

Example 5: Impact of MW of PDMS

In the present example, silanol-terminated PDMS having different average molecular weights were tested.

The materials so tested (all purchased from Gelest) are presented in Table 4, where information received from the manufacturer of the silanol-terminated PDMS is also reported for ease of reference.

TABLE 4

|  | Viscosity (mPa · s) | MW (g) | OH meq/g |
| --- | --- | --- | --- |
| DMS-S12 | 16-32 | 400-700 | 2.3-3.5 |
| DMS-S14 | 35-45 | 700-1,500 | 1.7-2.3 |
| DMS-S15 | 45-85 | 2,000-3,500 | 0.53-0.70 |
| DMS-S27 | 700-800 | 18,000 | 0.11-0.13 |

Each of the materials being tested were mixed in same weight amount with Dowsil™ RSN 0804 as described in Example 1 with respect to Composition No. 4. The resulting compositions, which will be referred to in this example by the name of the differing PDMS, were used to coat clean stainless steel foils and were cured as described in Example 2. The properties of the cured coatings were assessed according to Example 3, and the results are reported in Table 5.

TABLE 5

| PDMS | Average Peeling Force (N) | Adhesion | Abrasion (% Δ-gloss) |
| --- | --- | --- | --- |
| DMS-S12 | 2.355 | 0 | 12.6 |
| DMS-S14 | 0.047 | 0 | 21.5 |
| DMS-S15 | 0.030 | 1 | 24.3 |
| DMS-S27 | 0.033 | 5 | 31.7 |

As can be seen from the above table, two opposite trends are observed. On one hand, increasing the MW of the silanol-terminated PDMS reduces the force necessary to peel away an adhesive tape from the surface of the coating, indicating an increase in the releasability of the outer surface of the coating. On the other hand, increasing the MW of the silanol-terminated PDMS increases the occurrence of adhesion failures, indicating a decrease in the adhesion of the inner surface of the coating to the underlying support. Moreover, increasing the MW of the silanol-terminated PDMS also increases the loss in gloss of the coating following rubbing, hence decreases the abrasion resistance of the cured coating.

As this study was performed at a single ratio between the weight of the silanol-terminated PDMS and of a particular silicone resin, it cannot be ruled out that a PDMS material having a MW deemed insufficient or on the contrary excessive to achieve any desired property at this particular ratio and/or with this particular silicone resin would be within an appropriate range of MW at another ratio and/or when combined with a different silicone resin.

Likewise, the present results relate to the attachment of the coatings to a stainless steel support and it cannot be ruled out that a PDMS material having a MW deemed insufficient or on the contrary excessive to achieve proper attachment to this particular support would be within an appropriate range of MW for a support made of another material. In this context, it should be recalled that stainless steel is relatively hydrophilic, whereas the coating compositions according to the present teachings are relatively hydrophobic. As mentioned, stainless steel represents a surface relatively difficult to coat, in particular when, as in the present example, it contains a relatively high amount of chromium.

Still, the results of the present study suggest that the molecular weight of the materials participating in the preparation of coating compositions according to the present teachings should be taken into consideration when designing such compositions.

Example 6: Impact of Silicone Resin

In the present example, the impact of the type of silanol-functional silicone resin on the compositions and protective coatings resulting therefrom was tested.

In a first stage, the different resins were tested alone (in presence of curing agents) for adhesion to an underlying surface. The compositions were prepared as described in Example 1 with respect to Composition No. 1, coated and cured on a stainless steel foil as described in Example 2 and tested as described in Example 3.

In a second stage, the different resins were tested at 1:1 weight ratio with DMS-S14 (in presence of curing agents). The compositions were prepared as described in Example 1 with respect to Composition No. 4, coated and cured on a stainless steel foil as described in Example 2 and tested as described in Example 3.

The materials so tested (all by The Dow Chemical Company) are presented in Table 6, where information received from the manufacturer of the silicone resin is also reported for ease of reference, together with the results of the different stages of the study. For simplicity the results will be referred to in this example by the name of the differing silicone resins.

TABLE 6

|  | Dowsil ™ RSN 0804 | Dowsil ™ RSN 0431 | Dowsil ™ RSN 0805 |
| --- | --- | --- | --- |
| Silanol (wt. %) | 3 | 3 | 1 |
| R/Si ratio | 1.3 | 1.4 | 1.6 |
| Ph/Me ratio | 0.4/1 | 1.2/1 | 1.1/1 |
| Silica $SiO_2$ (wt. %) | 64 | 52 | 48 |

TABLE 6-continued

|  | Dowsil ™ RSN 0804 | Dowsil ™ RSN 0431 | Dowsil ™ RSN 0805 |
|---|---|---|---|
| Silicone Resin Alone | | | |
| Peeling Force (N) | 5.8 ± 0.9 | 8.6 ± 1.3 | 7.3 ± 0.6 |
| Adhesion | 0 | 0 | 1 |
| Silicone Resin:Silanol-Terminated PDMS (1:1) | | | |
| Peeling Force (N) | 0.05 ± 0.03 | 0.07 ± 0.04 | 0.08 ± 0.05 |
| Adhesion | 0 | 4 | 2 |
| Abrasion (% Δ-gloss) | 21.5 | 15.0 | 16.9 |

As can be seen from the above-table, while all resins when used in coatings lacking the silanol-terminated PDMS adhered to the underlying stainless-steel foil, all displayed poor releasability, as shown by the relatively high force required to peel away an adhesive tape from the surface of the "resin alone" coatings. All provided for good abrasion resistance, displaying a % Δ-gloss of less than 10%.

The addition of the silanol-terminated PDMS to the resins in the coating compositions modified these results, first and foremost with respect to releasability. As can be seen from the above table, the blend of the resins with PDMS dramatically reduced the force required to peel away an adhesive tape from the surface of the coatings (on average, from more than 7.2 N to less than 0.07 N). However, such addition came at cost for adhesion, depending on the silicone resin being used.

As this study was performed at a single ratio between the weight of a particular silanol-terminated PDMS and of the various silicone resins, on a single type of support, it cannot be ruled out that a resin deemed inappropriate at this particular ratio and/or with this particular PDMS and/or on this particular support (i.e., relatively hydrophilic stainless steel) could be suitable at another ratio and/or when combined with a different silicone resin and/or when applied to a different surface.

Likewise, the present results relate to the attachment of the coatings to a stainless steel support and it cannot be ruled out that a PDMS material having a MW deemed insufficient or on the contrary excessive to achieve proper attachment to this particular support would be within an appropriate range of MW for a support made of another material (stainless steel being particularly demanding as far as coating is concerned, in particular when containing a relatively high amount of chromium). In this context, it should be recalled that stainless steel is relatively hydrophilic, whereas the coating compositions according to the present teachings are relatively hydrophobic.

Still, the results of the present study suggest that the phenyl/methyl ratio of the silicone resins participating in the preparation of coating compositions according to the present teachings should be taken into consideration when designing such compositions.

Example 7: Impact of Reactivity of PDMS

In the coating compositions of the previous examples, the PDMS, when present was a reactive material (able to cure by condensation inter alia through its silanol termini). The purpose of the present example was to assess the role of this reactivity on a coating resulting from a blend of PDMS with a silicone resin.

In view of the results of Example 5, suggesting that the average molecular weight of the PDMS may affect the performance of the coating, two non-reactive PDMS compounds were mixed with one another to "mimic" the MW of the reactive silanol-terminated PDMS. DMS-S14 having a reported MW of 700-1,500, the non-reactive PDMS mixed at 1:1 weight ratio to yield a similar average MW were DMS-T07 (having a MW of 950) and DMS-T11 (having a MW of 1,250). All PDMS compounds (reactive and non-reactive) were purchased from Gelest. The reactive PDMS and the non-reactive blend were each mixed at a 1:1 weight ratio with Dowsil™ RSN 0804 and prepared according to Composition No. 4 of Example 1. Furthermore, control compositions were prepared lacking the curing agents as used in Composition No. 4. The four coating compositions were applied to a foil of stainless steel and cured as described in Example 2 and the performance of the cured coatings was assessed as described in Example 3, except for the abrasion resistance which was not measured. The results are reported in Table 7, where the positive sign "+" indicates the presence of a type of material in the coating composition and the negative sign "−" its absence.

TABLE 7

|  | I | II | III | IV |
|---|---|---|---|---|
| Silicone Resin | + | + | + | + |
| Reactive PDMS | + | + | − | − |
| Non-Reactive PDMS | − | − | + | + |
| Curing Agents | + | − | − | + |
| Peeling Force (N) | 0.050 | 0.060 | 1.300 | 0.770 |
| Adhesion (grade) | 0 | 0 | 1 | 2 |

As can be seen from the above table, the reactivity of the PDMS (see compositions I and II) contributes to the high adhesion of the coating to its underlying support and to the high releasability (low peeling force) of its outer surface. Non-reactive PDMS, yielded coatings having poorer adhesion and releasability. In this context, it should be noted that as the "cured" coatings including the non-reactive PDMS appeared rather oily, their ability to release an adhesive tape was checked again following cleaning of the coating with isopropyl alcohol. The cleaned surfaces displayed a further decreased releasability; a cleaned coating prepared from composition III now requiring a peeling force of 2.970 N, instead of 1.300 N, and a cleaned coating prepared from composition IV now requiring a peeling force of 3.030 N, instead of 0.770 N. It should be mentioned that this rather gentle cleaning of the surface also loosened the adhesion of the cleaned surfaces to the underlying support.

Surprisingly, while the foregoing analysis indicates that reactive PDMS should be preferred for coating compositions according to the present teachings, the presence of curing agents expected to further facilitate curing enabled by the reactivity of the PDMS is not essential. As can be seen from the comparison between composition I and II, the lack of curing agents in composition II does not substantially modify the outcome of the present study.

Example 8: Impact of Diluent/Number of Phases

As mentioned, the results of the previous examples are surprising, at least in so far that the coating compositions according to the present teachings result in biphasic compositions wherein the constituents able to react with one another are segregated into distinct compartments of oil phases. As this separation is expected to decrease the ability of the mixture to efficiently react and cure in a homogeneous manner, the present example set to test the properties of similar compositions further including a diluent (solvent or co-solvent) able to "merge" the reactive species in a single phase.

As the silicone resins tested so far were purchased diluted in toluene, this organic solvent was selected first to enable the miscibility of the silanol-terminated PDMS within a unique "oil" phase. Other solvents (or co-solvents in view of the inherent presence of toluene in the purchased resin) included butyl acetate, xylene, hexamethyl-disiloxane (HMDS) and decamethyl-cyclopentasiloxane. The compositions were prepared as described in Example 1 with respect to Composition No. 4 modified to include additional solvent, then coated and cured on a stainless steel foil as described in Example 3.

As the addition of up to 100 grams of HMDS or of up to 100 grams of D5, failed to yield a monophasic composition, their resulting coatings were not further analyzed. For simplicity the results will be referred to in this example by the amount of solvent (in grams) added to composition No. 4. The number of phases in each sample and the ability of the dissolved samples to wet the stainless steel foil, as compared to Composition No. 4 (referred to as composition A), are reported in Table 8.

TABLE 8

|  | A | B | C | D | E |
|---|---|---|---|---|---|
| Solvent | NR | Toluene | | Butyl-acetate | |
| Added Solvent (g) | 0 | 35 | 70 | 35 | 70 |
| No. of Phase(s) | 2 | 1 | 1 | 1 | 1 |
| Wetting | Good | Bad | Bad | Bad | Bad |

As can be seen from the above-table, while monophasic compositions (see, Compositions B-E) were expected to decrease the heterogeneity of the reference biphasic composition (Composition A), or in other words were expected to increase the homogeneity of the resulting coating, an opposite phenomenon was observed. Namely, having the constituents of the coating composition of the present invention in a single phase dramatically decreased the ability of the composition to uniformly wet the stainless steel support. In the above table, wetting was deemed "Bad" when the coating was not continuous (e.g., sufficiently retracted before full curing to leave uncoated voids, similar to craters). In some cases, additional failures were observed, such as the surface of the coating (where existing) providing for an uneven appearance (e.g., pin holes, orange peel, etc.).

Taken together, the results of the present examples, wherein the compositions were tested in laboratory settings, demonstrate that the mere mixing of two types of materials (one providing good release and the other providing good mechanical properties) is not sufficient to obtain a combination of the properties. First, the two materials should react with one another to yield an interpenetrated network despite their presence in distinct phases/compartments of the composition, and secondly the ratio between the materials and the characteristics of each should be tailored to the desired level of protection. Moreover, the coating composition need to interact with the underlying surface to achieve satisfactory adhesion. As readily appreciated by the skilled persons, the silanol moieties found in constituents of the coating composition may not only interact one with another, but also covalently bound with hydroxyl groups on the support.

Example 10: Indirect Digital Printing Press

Having established the potency of coating compositions according to the present invention in laboratory settings, the purpose of the present example was to gain confirmation of suitability in scaled-up commercial settings. This was performed on an S10P Nanographic Printing® press of Landa Corporation operated in duplex printing mode, wherein the same ink image was sequentially applied to a first side, then a second side of a paper sheet.

A coating composition corresponding to Composition No. 4 and a control corresponding to Composition No. 1 were prepared as described in Example 1 and each applied to an impression cylinder jacket made of a same stainless steel as the foil samples coated in the previous examples. A stainless steel foil having planar dimensions of approximately 100× 120 cm was cleaned using isopropyl alcohol, followed by water and detergent, then hexane and a final isopropyl alcohol rinsing. The cleaned foil was coated with a paint roller having an open-cell foam roll. Curing was performed as described in Example 3 and the thickness of the cured coating was measured as previously detailed and found to be of about 10 µm. A jacket (having planar dimensions of about 83.2×103 cm) was laser cut out of the foil coated with the cured composition and folded at its leading and trailing edges to permit insertion in recesses in the outer surface of the impression cylinder. The jacket coated with the composition under study was then mounted on the impression cylinder, the cured coating facing outwardly. An impression cylinder having an outer surface made a stainless steel material, but without any jacket protection, nor any coating, served as reference.

A test job consisting of C, M, Y, and K colors and having two levels of ink coverages corresponding to 100% and 200% ink (thus including eight rectangles, two for each color) was run for a series of predetermined number of cycles, the ink image being transferred to both sides of a sheet substrate having a B1 format (glossy coated paper having a thickness of 100 µm). The digital printing press was operated at a speed of 6,500 B1 Sheet Per Hour (namely at half this speed for the double printed sheets), the pressure applied at the impression nip was of about 100 N/cm$^2$ (corresponding to 1 megaPascal-MPa) and the temperature at which transfer took place was of about 120° C. for the transfer member (e.g., such as schematically depicted as 110 in FIG. 1), the pressure and impression cylinders (e.g., such as schematically depicted as 150 and 160 in FIG. 1) being at ambient temperature (not actively heated, nor cooled).

Figure 7:
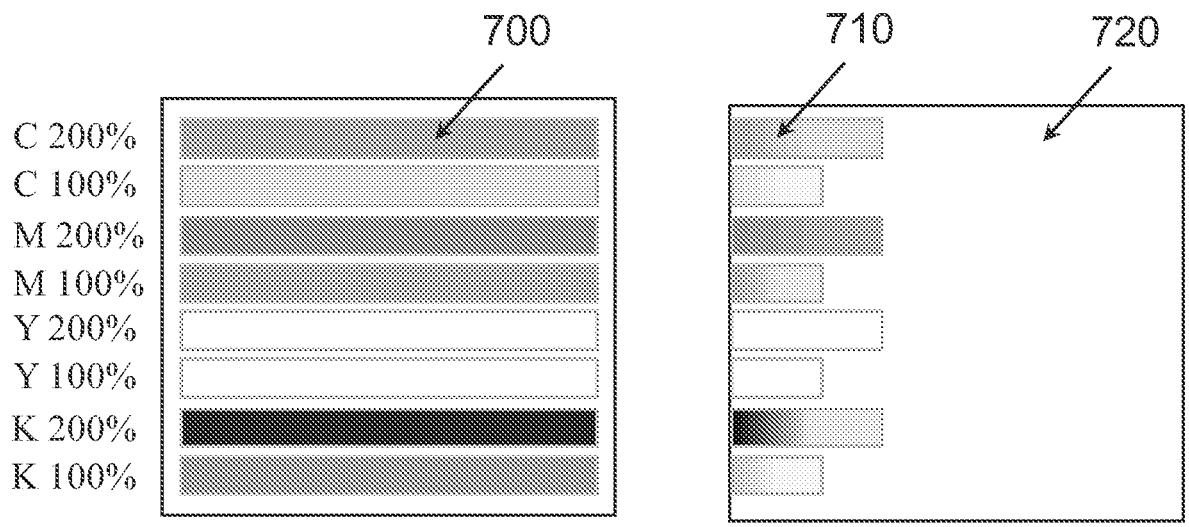
FIG. 7 schematically illustrates an ink image which may serve as a test job and how contaminants may build up on a surface repeatedly contacting such a test image.

The surface of the impression cylinder or of the protective coating on the cylinder jacket was examined at the beginning of the printing run, to establish the respective initial state, and following steps of at most 500 cycles of double-sided printing each, the number of subsequent step(s) depending on the outcome of a previous one. FIG. 7 schematically illustrates an image 700 resulting from a test job according to the example and shows how contaminants 710 may build up on the outer surface 720 of an impression cylinder or jacket. For clarity, the elements depicted in FIG. 7 are not to scale, moreover the contaminants are typically less regularly shaped than in the figure, generally appearing as a smear gradually decreasing. Still, it was generally observed that color stripes having a relatively higher amount of ink (200%) generated larger and/or longer smeared patches of "process-derived dirt" on the surface contacted with the ink image than color stripes having a relatively lower amount of ink (100%). Undesired transfer during perfecting was predominantly observed on the leading area of the surface, the extent of contaminants build-up generally, but not necessarily, decreasing towards the trailing edge of the surface. The number of cycles following which the surface showed visible signs of contamination is reported in Table 9.

TABLE 9

| Jacket | None | Comp. 1 | Comp. 4 |
|---|---|---|---|
| No. of cycles till build-up on jacket | <50 | <150 | >9,000 |

As can be seen from the above table, in absence of jacket, an impression cylinder having a stainless steel outer surface may rapidly accumulate traces of ink residues on its outer surface. Under the stringent conditions of the present experiment, the impression cylinder displayed contamination of its surface in less than 50 cycles of double-sided printing. Without wishing to be bound by any particular theory, this relatively rapid build-up of contaminants could be due to interactions between the ink residues and the stainless steel surface of the impression cylinder.

While a jacket coated with composition No. 1 protected the jacket surface for less than 150 cycles, but still 2-3 folds better than an uncoated surface, a jacket coated with composition No. 4 sustained at least 9,000 double-sided printing (higher number of cycles not having been tested). Thus, the protective coating resulting from the curing of composition 4 dramatically increased the number of cycles till appearance of contamination by more than two orders of magnitude, as compared to the naked impression cylinder. This significantly extends the amount of time a printing system may operate until cleaning of the surface of the impression cylinder (or jacket thereon) becomes necessary. These experimental values were obtained with relatively high amounts of ink (at least 100%) in the ink image of the test job. A skilled person can readily appreciate that the amount of contaminants and the time it may take for them to build-up on the surface may depend on the amount of ink in the image that may contact the surface under study. Therefore, images having a relatively lower ink coverage (less than 100%) may be double-printed for a relatively higher number of cycles before yielding visible surface contamination.

Furthermore, it should be noted that the appearance of contaminants on the impression cylinder or on a jacket thereof has no immediate impact on print quality. For illustration, while process-derived dirt may build-up on the cylinder in less than 100 cycles, such dirt may further contaminate a subsequent printing substrate only after 200 cycles or more. Still, such contaminants should preferably be removed from the surface of the cylinder (or protective coating thereof) before they visibly affect print quality. Therefore, protective coatings prepared according to the present teachings may extend the time needed before maintenance of the surface of the impression cylinder becomes necessary to ensure satisfactory print quality. As such cleaning can be part of standard maintenance of a printing system between any two print jobs, the protective coatings should preferably extend the operability (reliable functioning) of the coated surface till such standard maintenance is anyhow performed, preventing interruption during the performance of a single print job.

Whilst the beneficial effects of protective coatings according to the invention were demonstrated in a particular digital printing press, persons skilled in the printing field can readily appreciate that such settings are not limitative and the present teachings can be implemented in any other printing system, whether digital (i.e., where the image to be formed on the substrate is initially derived from a "virtual support"—a computer-based image file) or not (i.e., where the image to be formed on the substrate is initially derived from a "real support"—a printing plate). The non-digital printing techniques include, for instance, lithography, flexography, gravure, and letterpress.

Moreover, while in the above exemplified printing system 100 the image-forming station of the printing system is capable of forming the ink image by depositing a liquid ink material on selected regions of the ITM (by a suitable ink-jetting device), the ink material can alternatively be a solid ink. By way of example, the image-forming station of the printing system can be capable of forming the ink image by selectively activating an ink material deposited on the ITM. For instance, the image-forming station may selectively soften a dry ink material, so as to form a desired ink image transferable at the impression station. In some such embodiments, the image-forming station can include a coating station where particles of dry ink are deposited on the ITM and an imaging station selectively applying energy to the deposited particles. In one such embodiment, the applied energy is in the form of electromagnetic radiation. In one such embodiment, the ink consists of thermoplastic materials and the particles can also be referred to as "thermoplastic particles". In one such embodiment, the energy is applied to the thermoplastic particles from the side of the ITM upon which the ink was deposited, this first side being also referred to as the "front side". Alternatively or additionally, the energy can be applied to the thermoplastic particles from the side of the ITM opposite the front side, this second side being also referred to as the "rear side". In some embodiments, the imaging station includes thermal print heads or laser elements, the print heads and laser elements being capable of applying sufficient energy to the particles on the ITM, so as to selectively activate the particles and permit the transfer of the particles selectively activated at the impression station.

Example 11: Detection of Cured Protective Coatings

In the present example, means of identifying protective coatings prepared from the condensation-curable coating compositions according to the present teachings are provided. Such characteristics can be deduced by a person skilled in the art of chemical and material analysis based on the disclosure. The methods provided below are therefore illustrative, and additional methods may be used to reach similar characterizations. Some methods may be "non-destructive" to the coating, while others may require a transformation of the material to enable its analysis (e.g., extraction, melting, etc.)

On the level of molecular analysis, the protective coatings can be characterized by the presence of silicon atoms and/or silanol groups by FTIR, by Raman spectroscopy, or by thermogravimetry-infrared (TG-IR) spectrometry, to name a few, each method providing for bands characteristic of each chemical group or atom at specific wave number or in a vicinity thereof. Indeed, the presence of silicon atoms in cured coatings prepared according to previous examples was confirmed by FTIR analysis. Moreover, as previously explained, silicone-based compounds suitable for the preparation of the present compositions and coatings should preferably fulfil particular ratios between certain groups/moieties of the molecules (e.g., between phenyl and methyl moieties). Such preferred ratios are expected to transpire in the cured coatings.

To the extent the coatings were prepared by condensation curing in presence of a suitable catalyst, as typically preferred in industrial settings, the present coatings can be further identified by the presence of the catalyst or metal trace thereof. As tin or zinc catalysts are predominantly used, the presence of these metals can be detected, for instance, by scanning electron microscopy (SEM) with EDS detector suitable for the element to be detected.

With respect to the physical properties of the present coatings, it is believed that they are relatively hard as compared to traditional coatings based on silicone elastomers, as can be determined by any suitable method, for example by nano-indentation. They should be sufficiently hard to provide their intended protective effect for a meaningful duration of time. Such protective effect, besides the prevention of parasitic transfer as previously detailed, may further include absorbance of mechanical stress, prevention of cracking of the coat and its chipping-off from the underlying support. The present protective coatings may nevertheless be relatively "soft" as compared to their rigid supports, providing a "cushioning" effect to the coated surface. The hardness of a cured coating prepared using composition No. 4 was assessed using a sapphire sphere having a diameter of about 94 µm and compared to the hardness of the uncoated stainless steel substrate. While the support displayed a hardness of 26.3 MPa with a maximum indentation of 154 nm, a surface having a protective coating of about 10 µm displayed a hardness of 0.88 MPa with a maximum indentation of 1.58 µm.

This relative hardness provides for additional features of the coatings, for instance, resistance to abrasion. Abrasion resistance can be determined by a number of methods known to the skilled persons, and, for instance, as illustrated in Example 3. Following this particular procedure, the abrasion resistance of coatings prepared according to the present teachings can display a loss in gloss of less than 20%, less than 15%, less than 10%, less than 8% or less than 6%.

Another aspect of the present coatings is derived from the way the curable compositions are prepared, namely as oil-in-oil emulsions. As previously shown in Example 2, on a macroscopic level the present coatings were found relatively smooth, despite the fact that part of their reactive components was segregated from one another at the time they were applied onto the substrate to be coated. Yet, considering the deviation from the measured values, it was observed that the standard deviation in areal roughness $S_a$ was higher for the coated surface than for the uncoated baseline. Reverting to cured composition No. 4 as an example, the standard deviation from its average $S_a$ roughness of about 539 nm was of 15.8%, whereas the standard deviation from the average $S_a$ roughness of its stainless steel support was of only 3.8% from 225 nm. It is noted that while the standard deviation from average roughness of the coated surface is higher than the standard deviation from average roughness of the uncoated surface, being in the present case approximately four-fold on a percentage basis and about ten-fold when considered in nanometers, the measured deviation of the cured coats is still indicative of a relatively uniform surface (e.g., standard deviation≤20%).

On a microscopic level, it is expected that oil-in-oil emulsions may provide under particular circumstances a specific pattern once cured. For instance, if curing takes place before the droplets of the emulsion fully coalesce as the liquid vanishes from the coating, one can expect to "freeze" a situation where necks between neighboring contacting droplets would be observed. Such necks would necessarily be absent from coatings prepared from compositions made of a unique phase. Such micro-pattern across the thickness of the cured protective coating can be assessed by FIB microscopy.

Although the present disclosure has been described with respect to various specific embodiments presented thereof for the sake of illustration only, such specifically disclosed embodiments should not be considered limiting. Many other alternatives, modifications and variations of such embodiments will occur to those skilled in the art based upon Applicant's disclosure herein. Accordingly, it is intended to embrace all such alternatives, modifications and variations and to be bound only by the spirit and scope of the disclosure and any change which come within their meaning and range of equivalency.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

In the description and claims of the present disclosure, each of the verbs "comprise", "include" and "have", and conjugates thereof, are used to indicate that the object or objects of the verb are not necessarily a complete listing of features, members, steps, components, elements or parts of the subject or subjects of the verb.

As used herein, the singular form "a", "an" and "the" include plural references and mean "at least one" or "one or more" unless the context clearly dictates otherwise. At least one of A and B is intended to mean either A or B, and may mean, in some embodiments, A and B.

Unless otherwise stated, the use of the expression "and/or" between the last two members of a list of options for selection indicates that a selection of one or more of the listed options is appropriate and may be made.

Unless otherwise stated, when the outer bounds of a range with respect to a feature of an embodiment of the present technology are noted in the disclosure, it should be understood that in the embodiment, the possible values of the feature may include the noted outer bounds as well as values in between the noted outer bounds.

As used herein, unless otherwise stated, adjectives such as "substantially", "approximately" and "about" that modify a condition or relationship characteristic of a feature or features of an embodiment of the present technology, are to be understood to mean that the condition or characteristic is defined to within tolerances that are acceptable for operation of the embodiment for an application for which it is intended, or within variations expected from the measurement being performed and/or from the measuring instrument being used. When the term "about" and "approximately" precedes a numerical value, it is intended to indicate +/−15%, or +/−10%, or even only +/−5%, and in some instances the precise value. Furthermore, unless otherwise stated, the terms (e.g., numbers) used in this disclosure, even without such adjectives, should be construed as having tolerances which may depart from the precise meaning of the relevant term but would enable the invention or the relevant portion thereof to operate and function as described, and as understood by a person skilled in the art.

To the extent necessary to understand or complete the disclosure of the present disclosure, all publications, patents, and patent applications mentioned herein, including in particular the applications of the Applicant, are expressly incorporated by reference in their entirety by reference as if fully set forth herein.

Certain marks referenced herein may be common law or registered trademarks of third parties. Use of these marks is by way of example and shall not be construed as descriptive or limit the scope of this disclosure to material associated only with such marks.

The invention claimed is:

1. A condensation curable coating composition able to wet a surface to be coated therewith, the composition comprising:
    a) a polydimethylsiloxane (PDMS) having a silanol moiety, the silanol moiety being present in the PDMS at a weight per weight amount of 0.1 to 8.0 wt. %;
    b) a silicone resin having a silanol moiety, the silanol moiety being present in the silicone resin at a weight per weight amount of 0.5 to 10.0 wt. %; and
    c) a liquid carrier;
    wherein the PDMS and the silicone resin are substantially non-miscible one with the other, so that the condensation curable coating composition forms an oil-in-oil emulsion.

2. The coating composition according to claim 1, wherein the PDMS having a silanol moiety is a silanol-terminated PDMS.

3. The coating composition according to claim 1, wherein the PDMS having a silanol moiety fulfils at least one of the following structural features:
    a) the PDMS has an average molecular weight of at least 400 g/mol and at most 20,000 g/mol;
    b) the PDMS has a viscosity of at least 15 mPa·s and at most 1,000 mPa·s;
    c) the PDMS includes between 1 wt. % and 5 wt. % of silanol groups; and
    d) the PDMS includes between 30 wt. % and 45 wt. % of silicone atoms.

4. The coating composition according to claim 1, wherein the silicone resin fulfils at least one of the following structural features:
    a) the silicone resin has an average molecular weight of at least 500 g/mol and at most 300,000 g/mol;
    b) the silicone resin has a viscosity of at least 5 mPa·s and at most 2,000 mPa·s in presence of a solvent;
    c) the silicone resin includes between 0.5 wt. % and 5 wt. % of silanol groups by weight of solid resin;
    d) the silicone resin includes between 30 wt. % and 45 wt. % of silicone atoms by weight of solid resin;
    e) the silicone resin has a R/Si degree of substitution of 2 or less; and
    f) the silicone resin has a phenyl/methyl ratio of 2.8 or less.

5. The coating composition according to claim 1, further comprising at least one curing agent selected from crosslinkers and catalysts.

6. The coating composition according to claim 1, wherein the oil-in-oil emulsion includes droplets having an average diameter $D_N 50$ in a range from 250 nm to 10 µm, in a range from 500 nm to 7.5 µm, or in a range from 750 nm to 5 µm.

7. An article having at least one surface coated with a coating composition according to claim 1, the composition being fully cured on said surface.

8. The article of claim 7, wherein the article is a part of a printing system, selected from the group comprising impression cylinders, impression plates, perfecting cylinders, transport cylinders, grippers, clampers, guiding plates, guiding rollers, guiding projections, driving rollers, and tensioning rollers.

9. The article of claim 7, wherein the surface of the article coated with the cured coating composition is releasably attachable with respect to the article, the releasably attachable surface optionally being a replaceable cylinder jacket.

10. The article of claim 7, wherein the cured coating composition forms on the coated surface a uniform protective coating having a thickness in the range of 1 µm to 10 µm.

11. A printing system including an article having at least one surface coated with a composition according to claim 1, the composition being fully cured on said surface.

12. A kit for the preparation of a condensation curable coating composition, the kit comprising:
    I—a first compartment including a polydimethylsiloxane (PDMS) having a silanol moiety, the silanol moiety being present in the PDMS at a weight per weight amount of 0.1 to 8.0 wt. %, the first compartment optionally further including at least one curing agent provided that the PDMS is a non-reactive PDMS;
    II—a second compartment including a silicone resin having a silanol moiety, the silanol moiety being present in the silicone resin at a weight per weight amount of 0.5 to 10.0 wt. %;
    III—a third compartment including a liquid to further disperse a mixture to be formed by mixing contents of the first and second compartment; and optionally
    IV—a fourth compartment including at least one curing agent;
    wherein the PDMS of the first compartment and the silicone resin of the second compartment are substantially non-miscible one with the other, so that the condensation curable coating composition forms an oil-in-oil emulsion upon mixing thereof and upon dispersion within the liquid carrier of the third compartment.

13. The kit according to claim 12, adapted for the preparation of a condensation curable coating composition comprising:
    a) a polydimethylsiloxane (PDMS) having a silanol moiety, the silanol moiety being present in the PDMS at a weight per weight amount of 0.1 to 8.0 wt. %;
    b) a silicone resin having a silanol moiety, the silanol moiety being present in the silicone resin at a weight per weight amount of 0.5 to 10.0 wt. %; and
    c) a liquid carrier;
    wherein the PDMS and the silicone resin are substantially non-miscible one with the other, so that the condensation curable coating composition forms an oil-in-oil emulsion.

14. The coating composition according to claim 1, wherein the PDMS has a viscosity of at most 1,000 mPa·s.

15. The coating composition according to claim 1, wherein the PDMS has a viscosity of at most 750 mPa·s.

16. The coating composition according to claim 1, wherein the PDMS has a viscosity of at most 500 mPa·s.

17. The coating composition according to claim 1, wherein the PDMS has a viscosity of at most 200 mPa·s.

18. The coating composition according to claim 1, wherein the PDMS has a viscosity of at most 100 mPa·s.

19. The coating composition according to claim 1, wherein the PDMS includes at least 1 wt. % silanol groups.

20. A printing system comprising an:
intermediate transport member (ITM) comprising an endless belt; and
pressure and impression cylinders disposed opposite to each other to define an impression nip therebetween where ink-images on the ITM are transferred to substrate, the ITM passing through the impression nip, wherein at least one of a first condition, a second condition, a third condition and a fourth condition are true, and wherein the first through fourth conditions are defined as follows:
  i. according to the first condition, at least one surface of the pressure cylinder is coated with the coating composition according to claim 1;
  ii. according the second condition, at least one surface of the impression cylinder is coated with the coating composition according to claim 1; and
  iii. according to the third condition, a replaceable jacket is secured to the impression cylinder, said replaceable jacket being coated with the coating composition according to claim 1.

21. A method of protecting an impression cylinder of a printing system, the method comprising applying the coating of claim 1 to a jacket, curing the coating, and installing the jacket on the impression cylinder of the printing system.

22. The method of claim 21 wherein the coating is cured before the installing of the jacket.

* * * * *